(12) United States Patent
Cirkic et al.

(10) Patent No.: US 11,930,383 B2
(45) Date of Patent: Mar. 12, 2024

(54) METHODS AND APPARATUS FOR CATEGORISING WIRELESS DEVICES

(71) Applicant: Telefonaktiebolaget LM Ericsson (publ), Stockholm (SE)

(72) Inventors: Mirsad Cirkic, Linköping (SE); Joel Berglund, Linköping (SE); Pradeepa Ramachandra, Linköping (SE); Sakib Bin Redhwan, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 189 days.

(21) Appl. No.: 16/963,943

(22) PCT Filed: Sep. 21, 2018

(86) PCT No.: PCT/SE2018/050967
§ 371 (c)(1),
(2) Date: Jul. 22, 2020

(87) PCT Pub. No.: WO2019/199214
PCT Pub. Date: Oct. 17, 2019

(65) Prior Publication Data
US 2021/0044995 A1    Feb. 11, 2021

Related U.S. Application Data

(60) Provisional application No. 62/657,169, filed on Apr. 13, 2018.

(51) Int. Cl.
*H04W 24/00*    (2009.01)
*B64C 39/02*    (2023.01)
(Continued)

(52) U.S. Cl.
CPC .......... *H04W 24/10* (2013.01); *B64C 39/024* (2013.01); *G06N 20/00* (2019.01); *H04B 7/0626* (2013.01);
(Continued)

(58) Field of Classification Search
None
See application file for complete search history.

(56) References Cited

U.S. PATENT DOCUMENTS 10,032,464 B2 *  7/2018  Franklin ................ G10L 25/39
2014/0256347 A1  9/2014  Lakhzouri et al.
(Continued)

OTHER PUBLICATIONS

PCT International Search Report and Written Opinion dated Feb. 13, 2019 for International Application PCT/SE2018/050967, 15 pages.

(Continued)

*Primary Examiner* — Chirag G Shah
*Assistant Examiner* — Suk Jin Kang
(74) *Attorney, Agent, or Firm* — Sage Patent Group

(57) ABSTRACT

Embodiments herein relate to methods and apparatus for determining whether each of a plurality of wireless devices are drones or non-drones. The method includes determining based on binary classification of the first information which of the wireless devices meet all of at least one primary criterion; transmitting a request for second information to the wireless devices that meet all of the at least one primary criterion; receiving second information from each of the wireless device that meet all of the at least one primary criterion; determining based on binary classification of the second information which of the wireless devices that meet all of the at least one primary criterion also meet all of at least one secondary criterion; and classifying the wireless devices that meet both all of the at least one primary (Continued)

criterion and all of the at least one secondary criterion into the first category.

15 Claims, 21 Drawing Sheets

(51) Int. Cl.
*G06N 20/00* (2019.01)
*H04B 7/06* (2006.01)
*H04L 5/00* (2006.01)
*H04W 8/22* (2009.01)
*H04W 24/02* (2009.01)
*H04W 24/10* (2009.01)

(52) U.S. Cl.
CPC .......... *H04L 5/0051* (2013.01); *H04W 8/22* (2013.01); *H04W 24/02* (2013.01); *G06F 2218/12* (2023.01)

(56) References Cited

U.S. PATENT DOCUMENTS

| | | | |
|---|---|---|---|
| 2014/0274049 A1* | 9/2014 | Singh .................... | H04W 36/32 455/436 |
| 2014/0344451 A1 | 11/2014 | Luft et al. | |
| 2017/0019795 A1 | 1/2017 | Takahashi et al. | |
| 2017/0150373 A1* | 5/2017 | Brennan ................ | H04W 4/40 |
| 2017/0323572 A1* | 11/2017 | Chan ...................... | G08G 5/045 |
| 2018/0061249 A1* | 3/2018 | Cui ........................ | G08G 5/0043 |
| 2018/0062723 A1 | 3/2018 | Wilhelmsson et al. | |
| 2018/0107182 A1* | 4/2018 | Mohamadi ............. | G06V 10/82 |
| 2019/0180633 A1* | 6/2019 | Yoshizawa ............. | B64D 47/00 |
| 2019/0261197 A1* | 8/2019 | Bellamkonda ......... | H04W 16/18 |
| 2019/0306675 A1* | 10/2019 | Xue ....................... | B64C 39/024 |
| 2019/0313317 A1* | 10/2019 | Murphy ................. | H04W 36/0083 |
| 2020/0169928 A1* | 5/2020 | Hong ..................... | H04W 36/0094 |
| 2020/0187151 A1* | 6/2020 | Wang ..................... | H04W 24/10 |
| 2020/0220612 A1* | 7/2020 | Thomas ................. | H04B 17/345 |
| 2020/0242946 A1* | 7/2020 | Deluca .................. | G08G 5/0069 |
| 2020/0257287 A1* | 8/2020 | Schmidt ................ | G05D 1/0022 |
| 2020/0374775 A1* | 11/2020 | Kalhan .................. | H04W 36/38 |
| 2020/0374889 A1* | 11/2020 | Kalhan .................. | H04W 36/0058 |
| 2021/0022054 A1* | 1/2021 | Tsuda .................... | H04W 36/00835 |
| 2021/0185568 A1* | 6/2021 | Chang .................... | H04W 36/04 |
| 2021/0195492 A1* | 6/2021 | Chang .................... | H04W 36/0022 |
| 2021/0282091 A1* | 9/2021 | Kosseifi ................. | H04W 36/32 |
| 2021/0321311 A1* | 10/2021 | Lu .......................... | H04W 24/00 |
| 2021/0352593 A1* | 11/2021 | Zhang .................... | H04L 5/0048 |
| 2022/0026901 A1* | 1/2022 | Shaw ...................... | G05D 1/0027 |
| 2022/0026905 A1* | 1/2022 | Zavesky ................. | G06N 3/084 |
| 2022/0070754 A1* | 3/2022 | Murphy ................. | H04W 4/12 |
| 2022/0353724 A1* | 11/2022 | Lu .......................... | H04L 5/0069 |

OTHER PUBLICATIONS

NTT Docomo Inc. et al., "New SID on Enhanced Support for Aerial Vehicles", 3GPP TSG RAN Meeting #75, RP-170779, Dubrovnik, Croatia, Mar. 6-9, 2017, 4 pages.

Technical Specification Group Radio Access Network; 3GPP TR 36.777, "Study on Enhanced LTE Support for Aerial Vehicles (Release 15)", V15.0.0 (Dec. 2017), 142 pages.

Ericsson, 3GPP TSG RAN Meeting #78, RP-172826,"New WID on Enhanced LTE Support for Aerial Vehicles", Lisbon, Portugal, Dec. 18-21, 2017, 4 pages.

Trapeznikov et al., "Multi-stage classifier design", Mach Learn (2013), p. 479-502.

Ericsson, 3GPP TSG-RAN WG1 #90bis, R1-1717873, "On Interference Detection Schemes and RSRP Statistics for Aerial Vehicles", Prague, Czech Republic, Oct. 9-13, 2017, 8 pages.

Nokia, 3GPP TSG-RAN WG2 #100, R2-1713408, "Interference Detection and UAV Identification", Reno, USA, Nov. 27-Dec. 1, 2017, 8 pages.

Wigard, Jeroen et al., "Method for Detection of Airborne UEs Based on LTE Radio Measurements", Wireless Communication Networks, Aalborg University, Aalborg, Denmark, IEEE, 2017, 6 pages.

Amorim, Rafhael et al., "Machine-Learning Identification of Airborne UAV-UEs Based on LTE Radio Measurements", Department of Electronic Systems, Aalborg University, Denmark, IEEE, 2017, 6 pages.

Extended European Search Report for European Patent Application No. 18914435.5 dated Dec. 8, 2021, 13 pages.

Nokia, "Air-Borne UE Identification Mechanism", 3GPP TSG-RAN WG2 #99, R2-1708669, Berlin, Germany, Aug. 21-25, 2017, 5 pages, XP051318480.

Lin, Xingqin et al., "The Sky Is Not the Limit: LTE for Unmanned Aerial Vehicles", IEEE Communications Magazine, vol. 56, No. 4, Library Cornell University, Ithaca, NY, Jul. 4, 2017, 8 pages, XP081001896.

Yang, Guang et al., "A Telecom Perspective on the Internet of Drones: From LTE-Advanced to 5G", Library Cornell University, Ithaca, NY, Mar. 29, 2018, 8 pages, XP081224904.

NTT Docomo, "Initial Views on Interference Detection Schemes for Aerials", 3GPP TSG RAN WG1 Meeting 90bis, R1-1718175, Prague, CZ, Oct. 9-13, 2017, 5 pages, XP051351659.

CMCC, "MDT-Based Air-Borne UE Identification", 3GPP TSG-RAN WG2 Meeting #101bis, R2-1805521 (Resubmission of R2-1803218), Sanya, China, Apr. 16-20, 2018, 3 pages, XP051415992.

First Office Action dated Aug. 7, 2023 for Chinese Patent Application No. CN 201880090268.5, 9 pages (includes English translation).

Nokia et al.; "Air-borne UE identification mechanism"; 3GPP TSG-RAN WG2 #99bis; R2-1711446 (Update of R2-1708669); Prague, Czech Republic; Oct. 9-13, 2017; 8 pages.

* cited by examiner

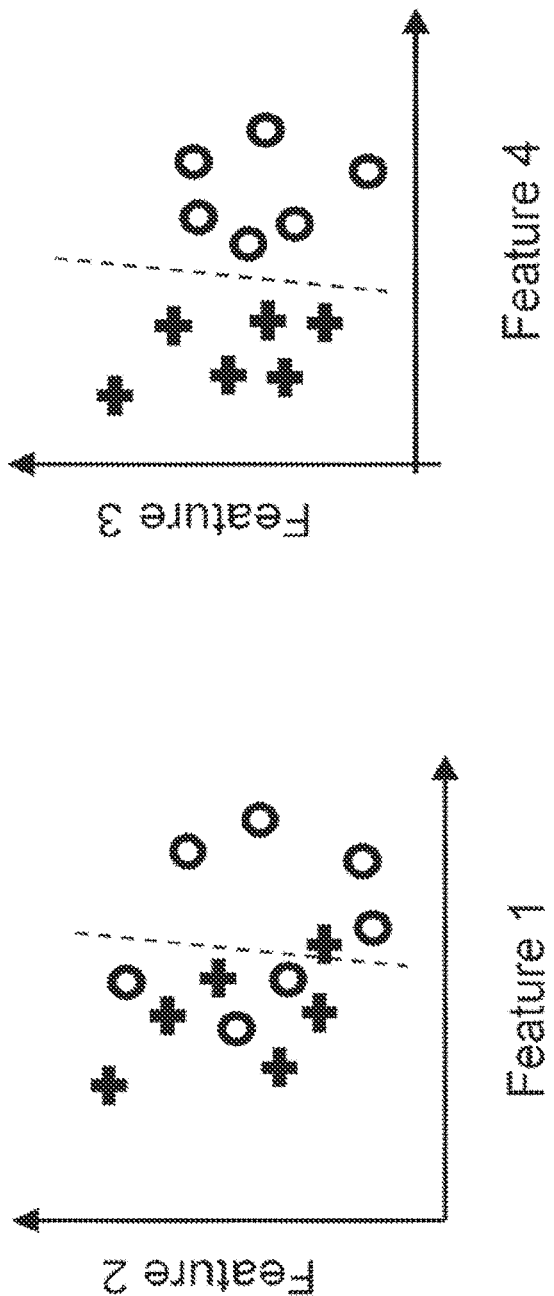

US 11,930,383 B2

METHODS AND APPARATUS FOR CATEGORISING WIRELESS DEVICES

CROSS-REFERENCE TO RELATED APPLICATIONS

This application is a 35 U.S.C. § 371 national stage application for International Application No. PCT/SE2018/050967, filed on Sep. 21, 2018, which in turn claims domestic priority to U.S. Provisional Application No. 62/657,169, filed on Apr. 13, 2018, the disclosure and contents of which are hereby incorporated by reference in their entireties.

TECHNICAL FIELD

Embodiments described herein relate to methods and apparatus for determining which of a first category associated with a first wireless device behaviour and a second category associated with a second wireless device behaviour each of a plurality of wireless devices fall into.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There is ongoing study relating to enhanced support for aerial wireless devices, for example, aerial vehicles or drones. The objective of such study is to investigate the ability for aerial wireless devices to be served using Long Term Evolution (LTE) network deployments (or any other suitable technology) with base station antennas targeting terrestrial coverage, for example supporting Release 14 functionality.

Some objectives may be to, firstly, identify potential enhancements to LTE so that it is better suited to provide connectivity and positioning services to aerial wireless devices in the identified deployment scenarios.

For example, interference mitigation solutions for improving system-level performance, solutions for detecting whether uplink signals from an air-borne wireless device increases interference in multiple neighbour cells, and solutions for identifying if enhancements in terms of cell selection and handover efficiency as well as robustness in handover signalling can be achieved.

Secondly, an objective may be to serve aerial wireless devices more efficiently and to limit the impact of aerial wireless devices on terrestrial wireless devices.

An air-borne wireless device may experience radio propagation characteristics that are likely to be different from those experienced by a wireless device on the ground. As long as an aerial wireless device is flying at low altitude, relative to the base station antenna height, it can be considered to behave like a conventional wireless device on the ground. However, once an aerial wireless device is flying well above the base station antenna height, the uplink signal from the aerial wireless device may become more visible to multiple cells due to line-of-sight propagation conditions. The uplink signal from an aerial wireless device may increase interference in the neighbour cells and the increased interference may result in a negative impact to wireless devices on the ground, for example smartphones, Internet of Things (IoT) devices, etc. Similarly, these line-of-sight conditions to multiple cells may incur higher downlink interference to the aerial wireless device.

Further, as illustrated in FIG. 1, as a base station antenna is 101 typically tilted downward such that the main lobe 102 of the beamformed signals is directed towards the ground, wireless devices 103 on the ground or below the base station height are likely served by the main lobe 102 of the beam formed signals. However, when an aerial wireless device 104 is flying above boresight, it is likely served by one of the side or back lobes 105 of the beamformed signals. These side and back lobes 105 have reduced antenna gains compared to the antenna gain of the main lobe.

FIGS. 2*a*, 2*b* and 2*c* show that the coverage area of a base station in the sky may be fragmented into several discontinuous areas, while the coverage area of a base station on the ground may usually be an approximate closed set. Also, for an aerial wireless device a cell which appears as the best cell may be further away from the aerial wireless device compared to the best cell for terrestrial wireless devices, as illustrated in FIG. 1. In FIGS. 2*a*, 2*b* and 2*c*, locations that are served by the same base station are shaded in the same grey tone, assuming that wireless devices connect to the strongest or best cell. FIG. 2*a* illustrates the scenario at ground level. FIG. 2*b* illustrates the scenario at 50*m* above ground level. FIG. 2*c* illustrates the scenario at 300*m* above ground level.

FIGS. 3*a*, 3*b* and 3*c* illustrate the geometry of the signal to interference ratio for wireless devices located at different heights above ground level. FIG. 3*a* illustrated the geometry at ground level. FIG. 3*b* illustrates the geometry at 50*m* above ground level. FIG. 3*c* illustrates the geometry at 300*m* above ground level. As expected, the higher the wireless device above ground level, the lower the quality of the signal becomes.

Machine learning can be used to find a predictive function for a given dataset; the dataset is typically a mapping between a given input to an output. The predictive function (or mapping function) is generated in a training phase, where the training phase assumes knowledge of both the input and output. The test phase comprises predicting the output for a given input. Applications of machine learning are for example curve fitting, facial recognition and spam filters. FIGS. 4*a* and 4*b* illustrate an example of one type of machine learning, namely classification, where the task is to train a predictive function that separates the two categories, a circle category and a cross category. In FIG. 4*a*, features 1 and 2 provide low separation of the output class, hence leading to a worse prediction performance in comparison with FIG. 4*b*. In FIG. 4*b* using feature 3 and 4 enables a better separation and classifying performance. In general, the performance of the machine learner is proportional to the correlation between the input and the output, and one key problem in machine learning is to find/create good features.

Aerial wireless devices that provide a video-feed to its flight controller over the mobile network for extended flying range may implicate high uplink streaming for the network. Such aerial devices are appearing more and more due to the application opportunities provided by extended range. Based on the traffic characteristics and the control characteristics, the mobile operators are likely to put the aerial wireless devices into separate service category associating different policies on them. Thus, it is important that mobile networks can identify if a wireless device is an aerial wireless device or a regular ground wireless device in order to provide the right service optimization for aerial wireless devices whilst protecting the performance of the ground wireless devices from the potential interfering signals from the aerial wireless devices.

For legitimate aerial wireless devices, standard mechanisms can be enforced so that these aerial wireless devices can be recognized by the networks. For example, it may be required that an operator of an aerial wireless device acquire a Subscriber Identity Module (SIM) card that is designed or registered for aerial wireless device use if the aerial wireless device is intended for use with a cellular connection, i.e., the aerial wireless device may be required to have a subscription indicative of its status as an aerial wireless device rather than a standard wireless device.

Another method may be to introduce aerial wireless device related radio access capacities into the standards such as for example, a), direct flying-status indication mechanisms so that aerial wireless devices can inform the network when they are in the flying mode; b), and measurement reporting enhancements so that the network can identify whether the aerial wireless device is flying and/or causing excessive interferences. However, these aerial wireless device related radio access capacities may not be applicable for legacy wireless devices.

However, "rogue" aerial wireless devices may be considered as any flying wireless device that either is not registered with the network or does not support aerial wireless device related radio access capacities. For example, there are some cases where a legacy wireless device may be attached to an aerial vehicle and may be flown around within the network. The flying terrestrial wireless device attached to the aerial vehicle may generate excessive interference within the network and may not be allowed by regulations in some regions. This phenomenon is being observed in the field and has drawn much attention from mobile operators. It is critical to identify these unlicensed rogue aerial wireless devices from the perspective of the operator and for the purpose of security measures.

One challenging problem here is that the legacy wireless devices may not have new features introduced as mentioned above to help the network to identify the flying status. The network may therefore have to rely on existing measurement report mechanisms to identify if a legacy wireless device is flying or not and in order to identify it as a "rogue" aerial wireless device.

There currently exist certain challenge(s). Methods for detecting aerial wireless devices, may involve the network evaluating every wireless device to determine whether or not it is an aerial wireless device. However, aerial wireless devices will be a minority in most wireless device populations, and thus evaluating every wireless device (collecting measurements and executing the classifier) may result in an unnecessarily high load on the network. For example, to enable accurate detection of each aerial wireless device, the network first needs to collect enough data to train a machine learning model that represents the wireless device population well enough, and then the network may need to collect data from each wireless device in the wireless device population to in order to accurately classify it as an aerial wireless device or a ground wireless device (regular). This process of collecting data from every wireless device may lead to a huge overhead on the network and have a significant impact in loaded networks since such data and processing is needed continuously.

SUMMARY

According to some embodiments there is provided a method, in a wireless device in a communications network, for providing second information to a network node to allow the network node to determine which of a first category associated with a first wireless device behaviour and a second category associated with a second wireless device behaviour the wireless device falls into. The method comprises receiving a request for a second information from the network node; and transmitting the second information to the network node, wherein the first category comprises a drone category and the second category comprises a non-drone category.

According to some embodiments there is provided a method, in a network node in a communications network, for determining which of a first category associated with a first wireless device behaviour and a second category associated with a second wireless device behaviour each of a plurality of wireless devices fall into. The method comprises determining based on binary classification of a first information which of the wireless devices meet all of at least one primary criterion; transmitting a request for second information to the wireless devices that meet all of the at least one primary criterion; receiving second information from each of the wireless device that meet all of the at least one primary criterion; determining based on binary classification of the second information which of the wireless devices that meet all of the at least one primary criterion also meet all of at least one secondary criterion; and classifying the wireless devices that meet both all of the at least one primary criterion and all of the at least one secondary criterion into the first category, wherein the first category comprises a drone category and the second category comprises a non-drone category.

According to some embodiments there is provided a network node in a communications network, for determining which of a first category associated with a first wireless device behaviour and a second category associated with a second wireless device behaviour each of a plurality of wireless devices fall into. The network node comprising processing circuitry configured to determine based on binary classification of a first information which of the wireless devices meet all of at least one primary criterion; transmit a request for a second information to the wireless devices that meet all of the at least one primary criterion; receive the second information from each of the wireless device that meet all of the at least one primary criterion; determine based on binary classification of the second information which of the wireless devices that meet all of the at least one primary criterion also meet all of at least one secondary criterion; and classify the wireless devices that meet both all of the at least one primary criterion and all of the at least one secondary criterion into the first category, wherein the first category comprises a drone category and the second category comprises a non-drone category.

According to some embodiments there is provided a wireless device in a communications network, for providing second information to a network node to allow the network node to determine which of a first category associated with a first wireless device behaviour and a second category associated with a second wireless device behaviour the wireless device falls into. The wireless device comprises processing circuitry configured to: receiving a request for a second information from the network node; and transmitting the second information to the network node, wherein the first category comprises a drone category and the second category comprises a non-drone category.

Certain aspects of the present disclosure and their embodiments may provide solutions to these or other challenges. The invention describes a framework for efficient detection of wireless devices in a particular category, such as aerial wireless devices, by using a layered detection procedure in order to avoid conducting unnecessary measurements and computations. The idea is to have a two-step procedure. The first step comprises performing a crude classification which does not require dedicated measurements to be performed by the wireless devices, and is preferably simple to process computationally. The first step should produce a subset of wireless devices in the wireless device population. The second step comprising instructing the subset of wireless devices to collect dedicated measurements to perform an accurate classification. The embodiments described herein are illustrated with a drone (or aerial wireless device) detection problem. The methods and apparatus described herein, however, may equally be used for other types of classification, for example classifying wireless devices be their speed.

There are, proposed herein, various embodiments which address one or more of the issues disclosed herein.

Embodiments described herein are described within the context of Long Term Evolution (LTE), i.e. E-UTRAN. However, it will be appreciated that the methods and apparatus described herein are equally applicable to wireless access networks and wireless devices or user equipments (UEs) implementing other access technologies and standards. LTE is used as an example technology within which the invention is suitable, and using LTE in the description therefore is particularly useful for understanding the problem and solutions solving the problem.

Certain embodiments may provide one or more of the following technical advantage(s). The advantages of the embodiments described herein are significantly reduced signaling overhead since only a subset of wireless devices are explicitly instructed to collect measurements dedicated for determining which category the wireless devices fall into, and likely reduced processing complexity since the more accurate second step is applied on the same subset of wireless devices.

BRIEF DESCRIPTION OF THE DRAWINGS

FIGS. 4a and 4b illustrate an example of one type of machine learning, namely classification, where the task is to train a predictive function that separates the two categories, a circle category and a cross category;

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The invention comprises a two-stage procedure which involves two sets of criteria, primary criteria and secondary criteria, both solving the same binary classification problem, for example distinguishing between drone and non-drone (regular) wireless devices. The basic flowchart is summarized in the FIG. 5. In some examples, the primary criteria and secondary criteria are generated using machine learning.

Figure 5:
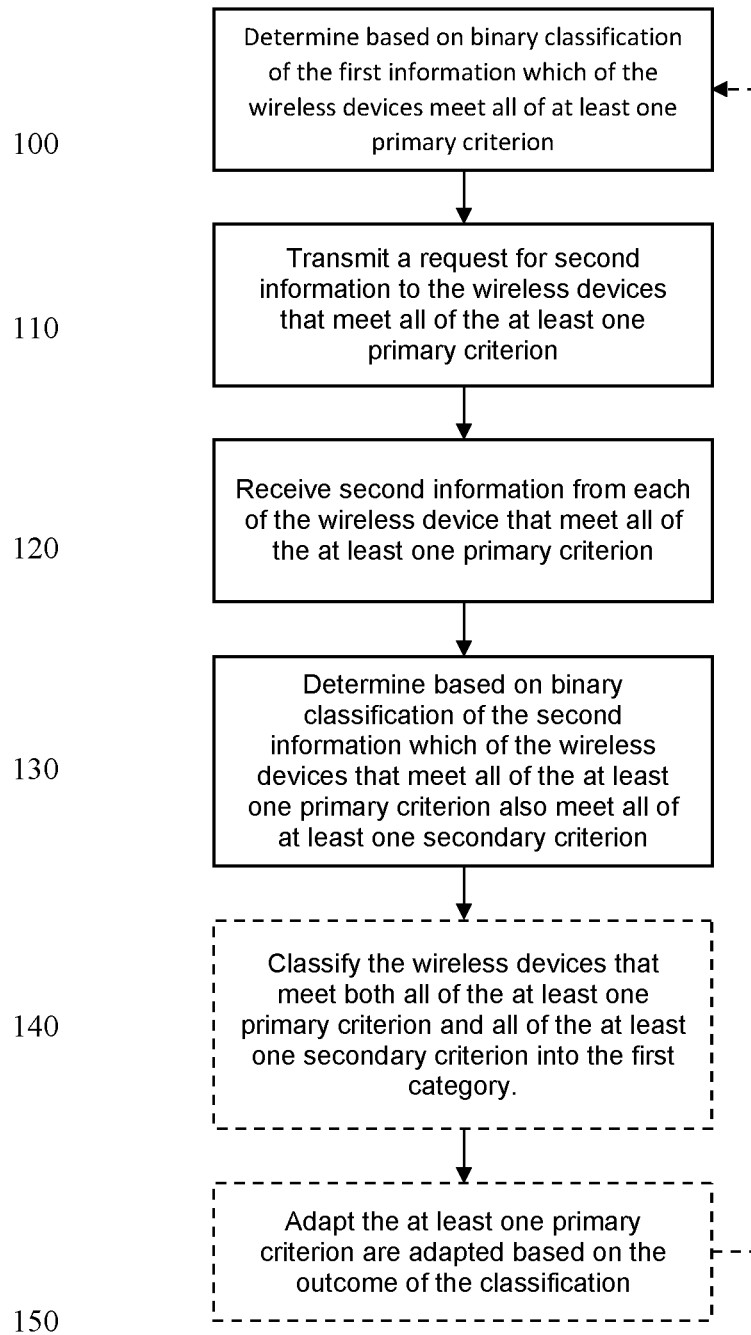
FIG. 5 illustrates a method performed by a network node for determining which of a first category associated with a first wireless device behaviour and a second category associated with a second wireless device behaviour each of the wireless devices fall into according to some embodiments.

FIG. 5 illustrates a method performed by a network node for determining which of a first category associated with a first wireless device behaviour and a second category associated with a second wireless device behaviour each of the wireless devices fall into. For example, the first wireless device behaviour may comprise behaviour expected from drone wireless devices and the second wireless device behaviour may comprise behaviour expected from non-drone wireless devices. The examples described below relate to drones being the first category, and non-drones being the second category. However, it will be appreciated that other categories may equally be used.

The first stage of the process provides a crude classification of the wireless devices in the population. In this example, this first stage comprises step 100 as illustrated in FIG. 5.

In step 100 the network node, for every wireless device in the wireless device population of interest, performs a first basic classification procedure. For example, the network node may determine based on binary classification of first information which of the wireless devices meet all of at least one primary criterion.

For example, the at least one primary criterion may be generated using a simple machine learning model, which may be trained based measurements that are already available to the network. In particular the at least one primary criterion may be generated using machine learning based on training information of a same type as the first information. For example, the first information may comprise measurements such as timing advance (TA) measurements, uplink data streams, and uplink signal strength measurements. The at least one primary criterion may comprise a criterion for each type of first information. By utilizing measurements already available to the network, for example network information provided to the network as part of normal operation of each wireless device, the method provides a "cheap" potentially crude filter which has a low probability of misclassifying a drone wireless device as a regular wireless device.

This low probably of misclassifying a drone wireless device as a non-drone wireless device may result in the sacrifice of a higher probability of misclassifying a non-drone wireless device as a drone wireless device.

In a receiver operating characteristic (ROC) curve, this relationship between the probability of misclassifying a drone wireless device as a non-drone wireless devices and misclassifying a non-drone wireless device as a drone, is represented by the ratio between the true positive rate (TPR) and false positive rate (FPR), where a high value of TPR corresponds to low probability of classifying a drone wireless device a no-drone wireless device. Such a classifier will have a low risk of missing drone wireless devices and will reduce the size of the set of wireless devices to consider as being drone wireless devices in step 110 of FIG. 5, as will be described later. In this step therefore the at least one primary criterion are such that wireless devices meeting all of the at least one primary criterion have a first false positive rate and a first true positive rate of being in the first category.

In some embodiments, this classification could be based on first information comprising the amount of uplink resources requested by the wireless device, where for example those wireless devices having larger uplink resource requests are classified as drones and the others are not. In another embodiment, this classification could be based on first information comprising the line of sight (LOS) detection in downlink, where for example those wireless devices having at most a rank-1/2 transmission are classified as drones and the others are not (where the number of ranks depends on how the polarizations are used). In yet another embodiment, this classification could be based on first information comprising handover statistics of the wireless devices, where for example, those wireless devices that are handed over from a particular cell or list of cells are classified as drones and the others are not. In yet another embodiment, one could use any combination of the above described options for the first information. Specifically the first information may be already available to the network in some way. In addition, the first information may comprise an indication, from the NDA (Network Data Analytics) functionality in the core network, indicating explicitly to the network node that the requested service from a wireless device is of a drone type (based on the application data analysis). It is to be noted that in any of these methods, the wireless device may not be expected to perform and report any additional or dedicated measurements than the ones that it performs for its usual operation in order for the network node to receive the first information.

Steps 110, 120 and 130 comprise the second "stage" of the process in which the network node instructs the subset of wireless devices produced by the first step in step 100, i.e. the wireless devices that meet all of the at least one primary criterion, to collect dedicated measurements to perform an accurate classification using at least one secondary criterion.

In step 110, the network node transmits a request for second information to the wireless devices that meet all of the at least one primary criterion.

The second information may comprise explicitly ordered measurements, such as dedicated uplink pilot (for example, sounding reference signal (SRS), or a Random Access Channel (RACH)) transmissions and their respective measurements in the neighboring base stations and/or periodic downlink measurement reporting including measured reference signal received power (RSRP) values from different cells or channel state information reference signal (CSI-RS) related measurement reports (CSI-RS reports for serving cell and CSI-IM related reports for neighbor cells), or a combination of the above. There may be a secondary criterion for each type of second information.

In step 120, the network node receives the second information from each of the wireless devices that meet all of the at least one primary criterion.

In step 130, the network node determines based on binary classification of the second information which of the wireless devices that meet the at least one primary criterion also meet at least one secondary criterion.

In some examples, step 130 also takes into consideration the first information in combination with the second information when determining which of the wireless devices that meet the at least one primary criterion also meet at least one secondary criterion.

The at least one secondary criterion may be generated using machine learning based on training information of a same type as the second information. The machine learning model used to generate the secondary criterion may be more advanced than the machine learning model used to generate the primary criterion.

As the model used to generate the at least one secondary criterion may be executed on a smaller set of wireless devices than the population of wireless device that was filtered in the first step using the at least one primary criterion, this model can afford to be more accurate as the load on the network will be smaller as not so many wireless devices are being evaluated. The purpose of the secondary criterion is to provide a more accurate classification of the wireless devices than the primary criterion. In other words the at least one secondary criterion may produce a larger area under the ROC curve when classifying wireless devices, and operate at a point where the probability of classifying a non-drone wireless device as a drone is very small with the sacrifice of a slightly increased probability of classifying a drone wireless device as a non-drone wireless device (small false positive rate (FPR) at the cost of a lower true positive rate (TPR)). In practice, this tradeoff can be based on the characteristics of the ROC curve, where for example a high gain in TPR at the cost of a small increase of FPR may be considered acceptable.

In other words, the at least one secondary criterion are such that wireless devices meeting all of the at least one secondary criterion have a second false positive rate and a second true positive rate for being in the first category, wherein the second false positive rate is lower than the first false positive rate and the second true positive rate is lower than or equal to the first true positive rate.

The true positive rate and false positive rates may be computed based on all the wireless devices in the considered population.

In some examples, in step 140, the network node classifies the wireless devices that meet both all of the at least one primary criterion and all of the at least one secondary criterion into the first category, for example as drone wireless devices.

Only those wireless devices that are classified as drone wireless devices based on both the at least one primary and the at least one secondary criterion are labelled as actual drone wireless devices.

In some examples, the results from the second step (steps 110 to 130) can be used to exclude/include particular wireless devices in future detection procedures, for example to avoid repetitive explicit measurements from a wireless device which has already been classified as a non-drone wireless device, or to perform more measurements to accumulate a stronger certainty that a wireless device is a drone wireless device.

In another embodiment of the invention, the at least one primary criterion used in step 100 may be further reinforced/tuned based on the outcome of the steps 130 and/or 140. As step 100 is very conservative in nature, and steps 130 and/or 140 are very accurate, any learnings from steps 130 and/or 130 regarding the primary criterion used in step 100 may further reduce the number of wireless devices which require evaluation in steps 110 to 130 by increasing the accuracy of step 100.

This feedback of the outcome of steps 130 and/or 140 is illustrated in FIG. 5. In the step 150, the at least one primary criterion are adapted based on the outcome of the classification in step 140. In other words, the network node may continually update the at least one primary criterion using machine learning based on wireless devices classified into the second category on the basis of not meeting the secondary criterion.

The two-step procedure illustrated in FIG. 5 may therefore be very efficient in terms of overhead and at the same time be very accurate when determining whether a wireless device falls into a first category or into a second category. As stated previously, this idea is not restricted to drone and non-drone detection but can also be used for other types of detection/classification where the two-step procedure can provide a more efficient classification. For example, for wireless device speed classification.

In this example, in step 100, the first category, i.e. high speed or a second category, i.e. normal speed based on first information comprising the number of handovers/cell reselections in the past 'X' seconds, wherein wireless devices having more than 'N' handovers/re-selections in the past 'X' seconds may meet the primary criterion. For those wireless devices that meet all of the at least one primary criterion in step 100, the decision may be further reinforced based on second information comprising the time series of RSRP values in for example, an RRC_CONNECTED mode, wherein those wireless devices who have a 'larger' rate of change of RSRP may be determined to meet all of the at least one secondary criterion and may then be classified as high speed wireless devices in the first category.

Figure 6:
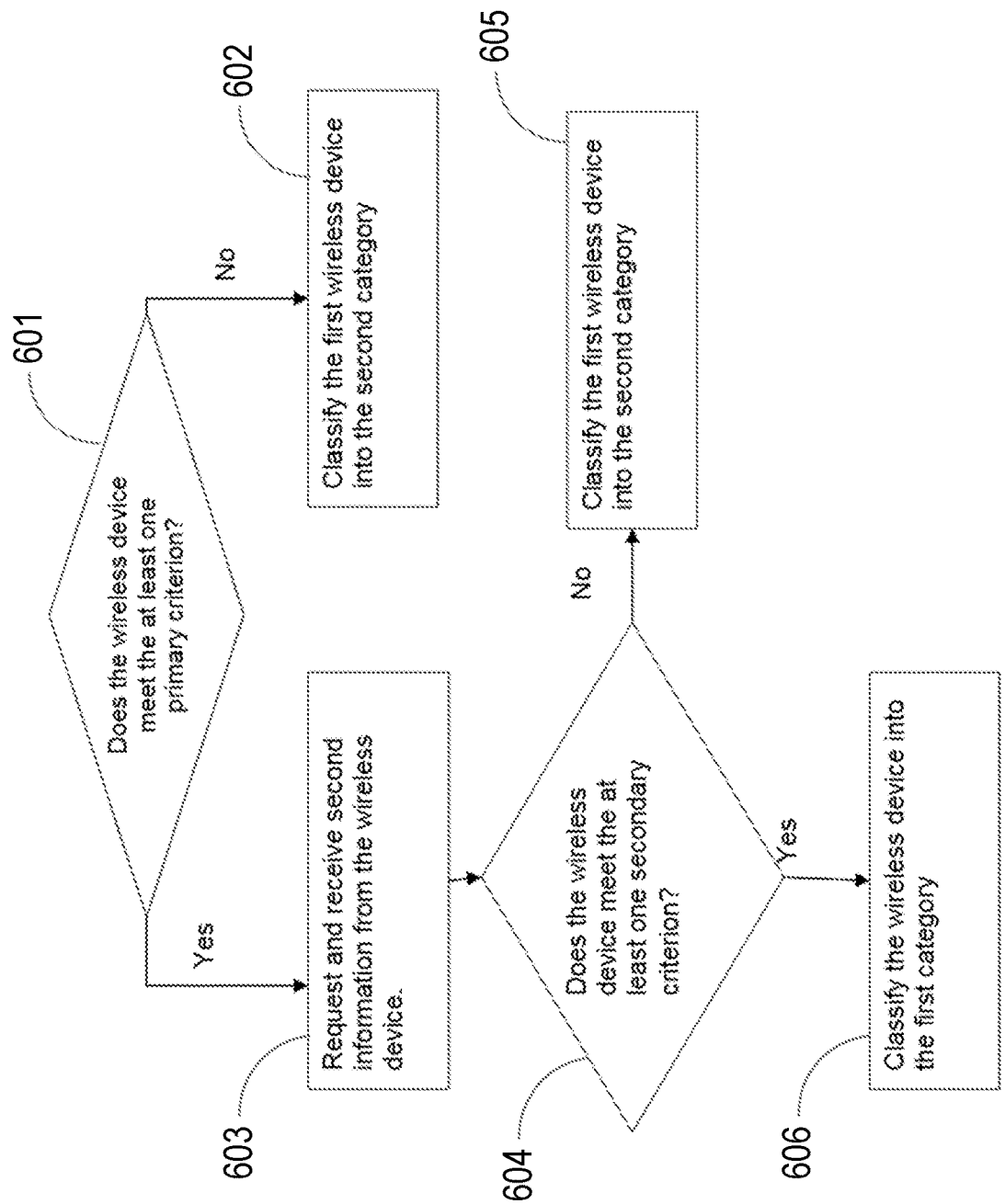
FIG. 6 illustrates a method according to some embodiments.

For each wireless device in a population of wireless devices therefore, the method as illustrated in FIG. 6 may be performed by a network node.

In step 601 the network node determined whether the wireless device meets all of the at least one primary criterion. This step is performed based on first information already available to the network node relating to the wireless device If in step 601 the network node determines that the wireless device does not meet all of the at least one primary criterion, the network classifies the wireless device into the second category in step 602.

If in step 601 the network node determines that the wireless device does meet all of the at least one primary criterion, the network requests and receives secondary information from the wireless device in step 603.

In step 604 the network node determines whether the wireless device meets all of the at least one secondary criterion based on the second information.

If in step 604 the network node determines that the wireless device does not meet all of the at least one secondary criterion, the network node classifies the wireless device into the second category in step 605.

If in step 604 the network node determines that the wireless device does meet all of the at least one secondary criterion, the network node classifies the wireless device into the first category in step 606.

In particular, as described in the background section, the network may decide to provide adjusted or altered services to a wireless device in a particular category, for example to avoid excess interference produced by drone wireless devices at high altitudes. In other words, the network node may adjust a communications service provided to each wireless device based on the category that each wireless device is classified into.

It will also be appreciated that there may be more than two categories of wireless device. In this example, the categories may be split down further by for example, repeating the method for wireless devices in a first category to separate the wireless devices in the first category into a third and fourth category.

It will be appreciated that the network node may comprise any suitable network node, or may be a virtual node. In some examples, the network node comprises a base station. In some examples, the network node comprises a Network Data Analytics node in the core network.

Embodiments disclosed herein therefore provide a multi-stage layered approach to efficiently classify wireless devices into different categories without requiring a heavy load on the network. The first stage of the detection can be a simple machine learning model, or some predefined rules based on statistics to exclude wireless devices that are easily classifiable as not being part of a first category, which in examples above is a drone wireless devices category. The second step comprises a ML model focusing on accuracy for effective classification, where a more advanced procedure may be employed on a smaller set of wireless devices and a very accurate determination of whether a wireless device is classified as being part of the first category (drone UE). The example scenario in the embodiments above describe classification of wireless devices as being drone/non-drone, however, the principle may be applied to any such classification problems.

Figure 1:
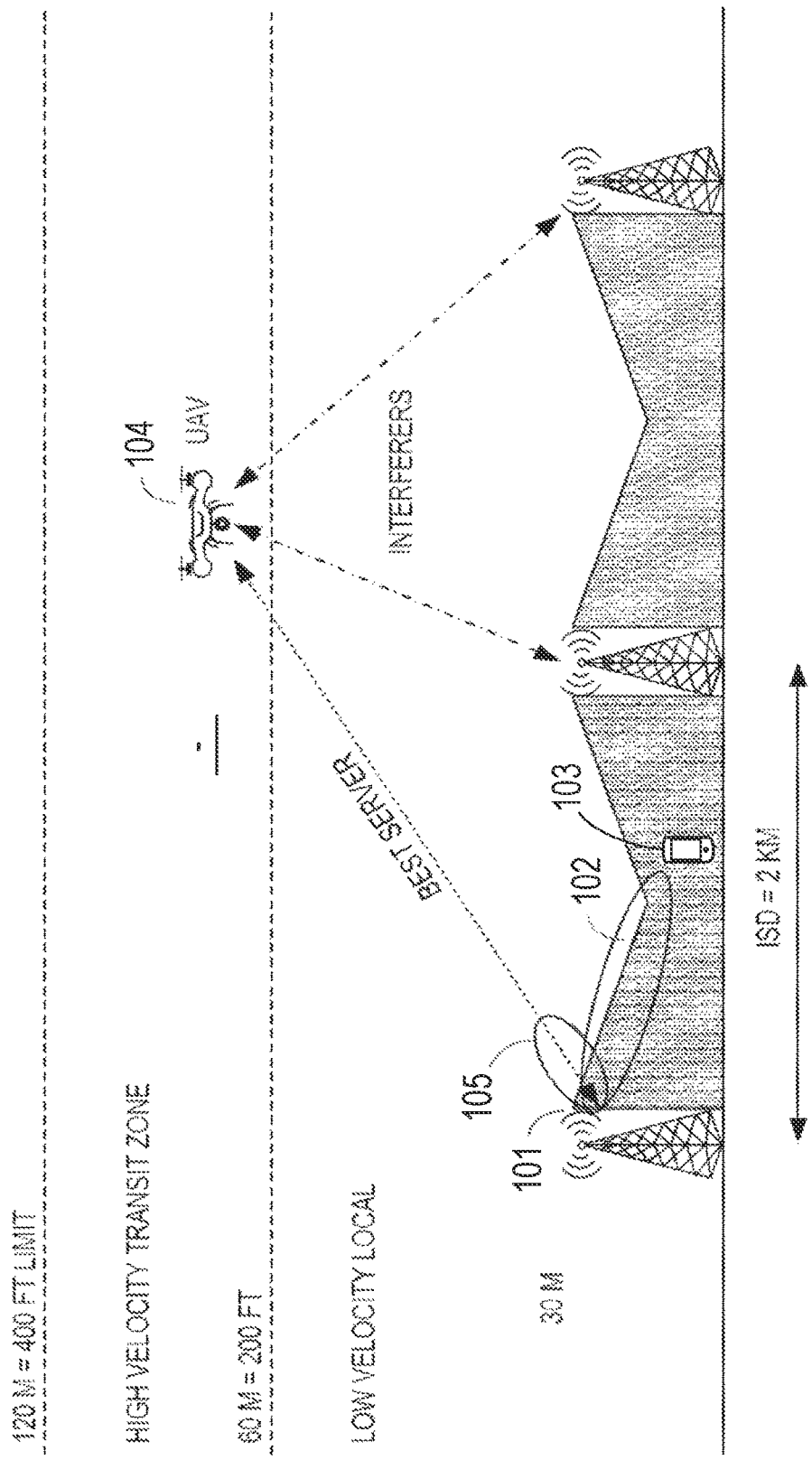
FIG. 1 illustrates an aerial wireless device for which a cell which appears as the best cell may be further away from the aerial wireless device compared to the best cell for terrestrial wireless devices.
Figure 2A:
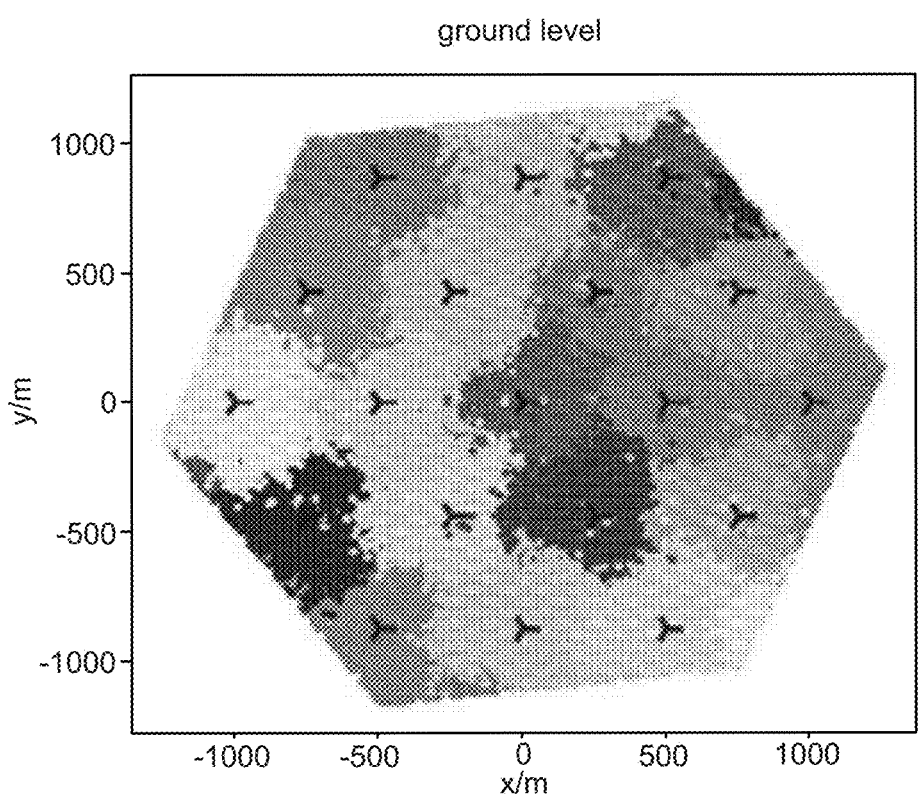
FIGS. 2a, 2b and 2c illustrate how the coverage area of a base station in the sky may be fragmented into several discontinuous areas.
Figure 2B:
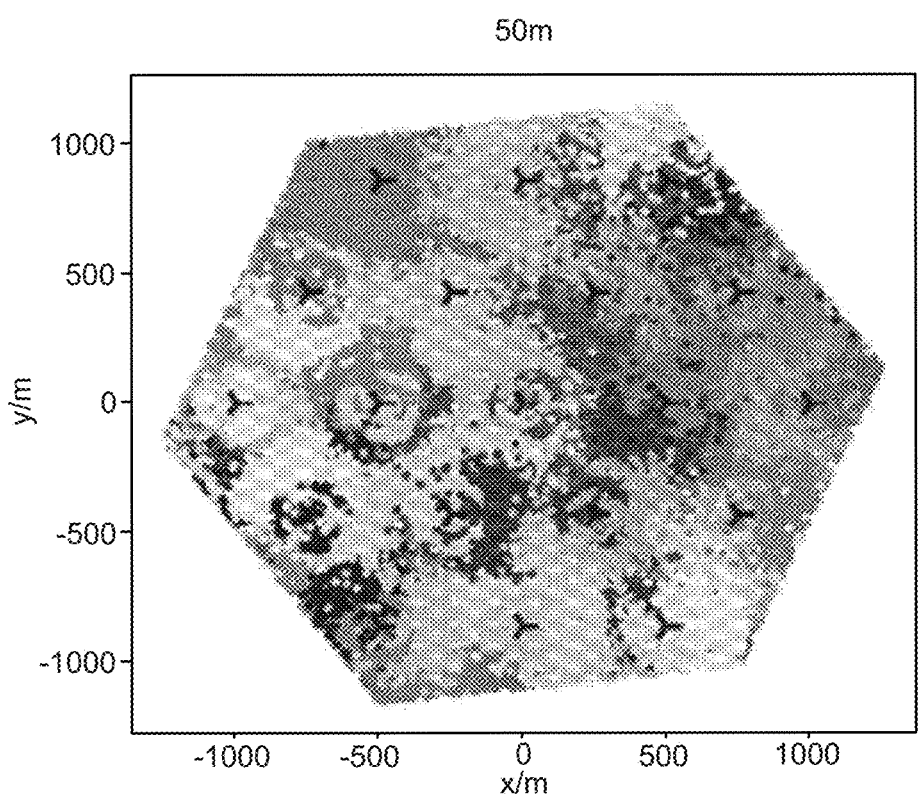
Figure 2C:
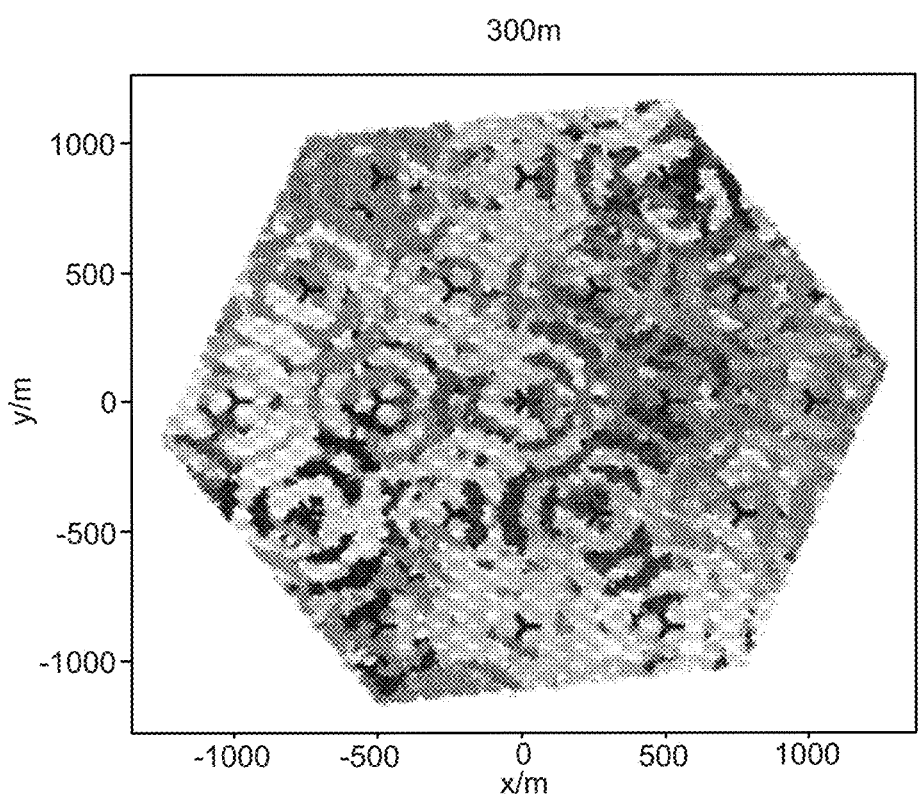
Figure 3A:
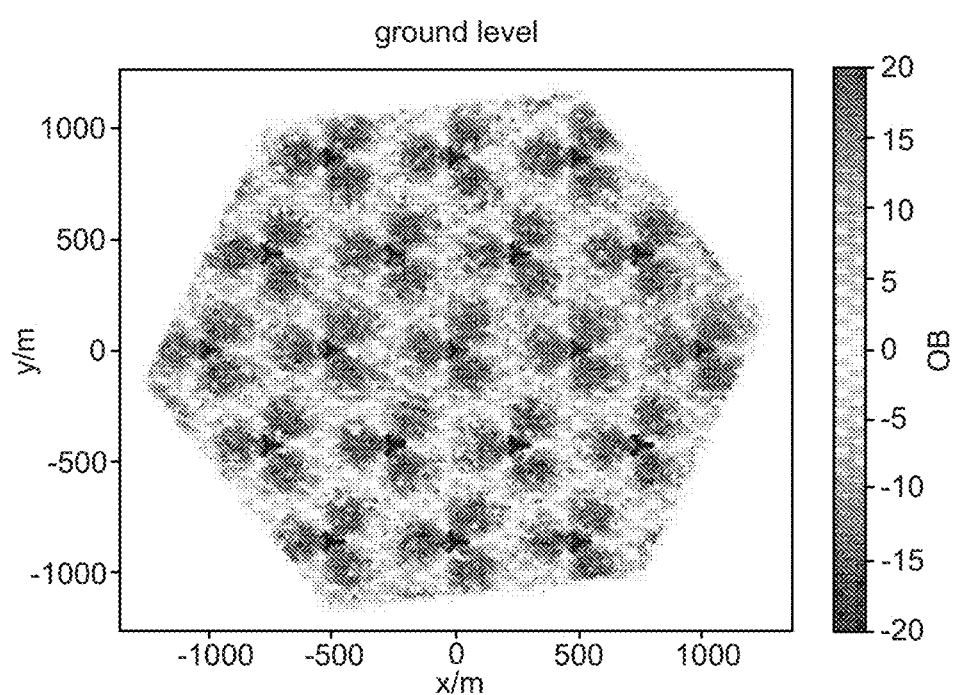
FIGS. 3a, 3b and 3c illustrate the geometry of the signal to interference ratio for wireless devices located at different heights above ground level.
Figure 3B:
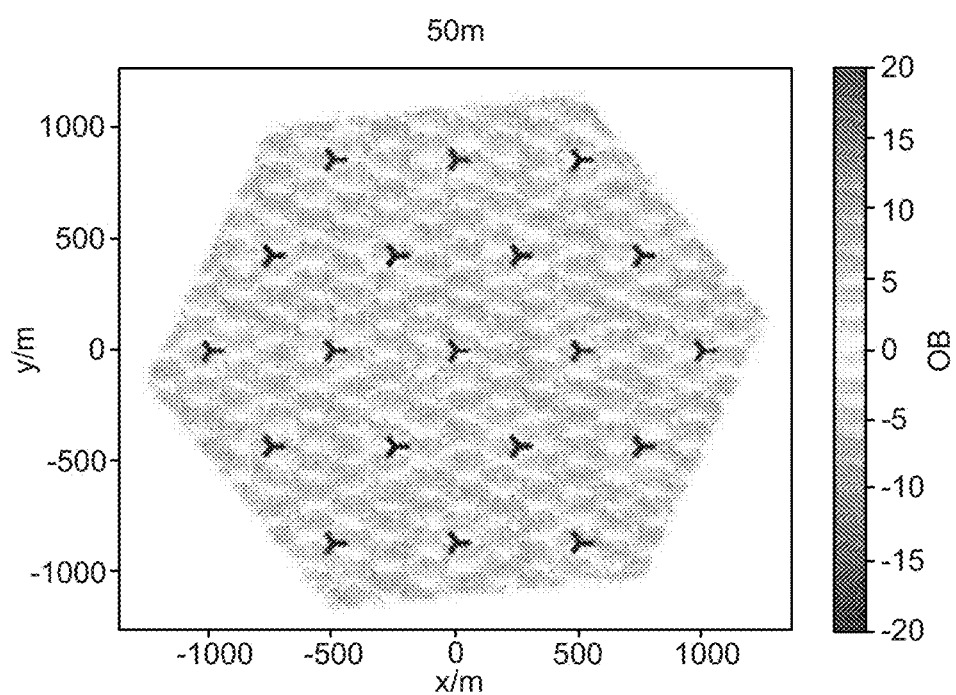
Figure 3C:
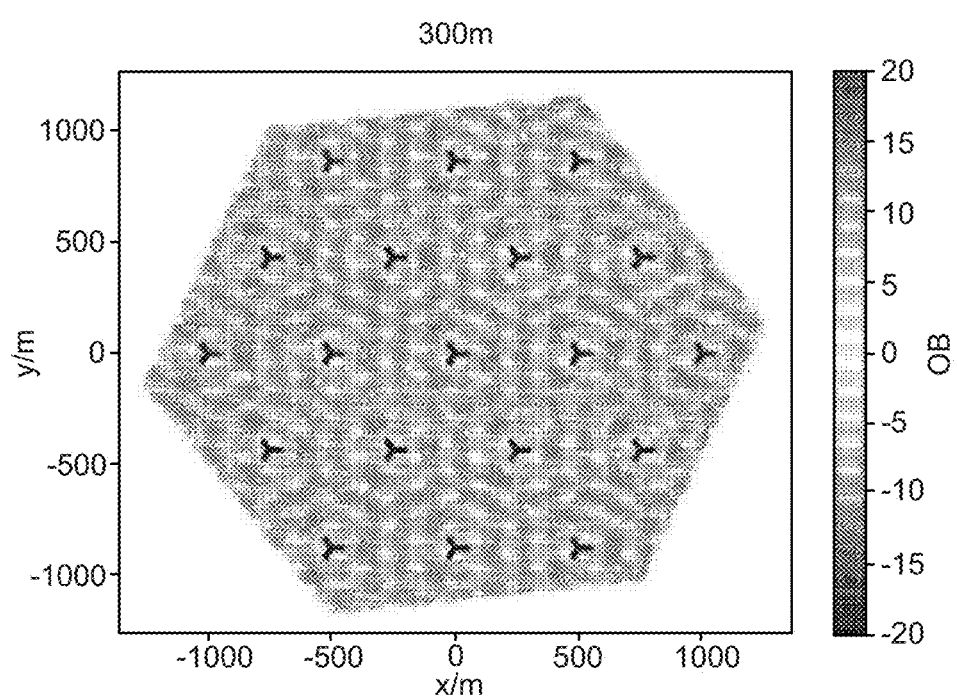
Figure 7:
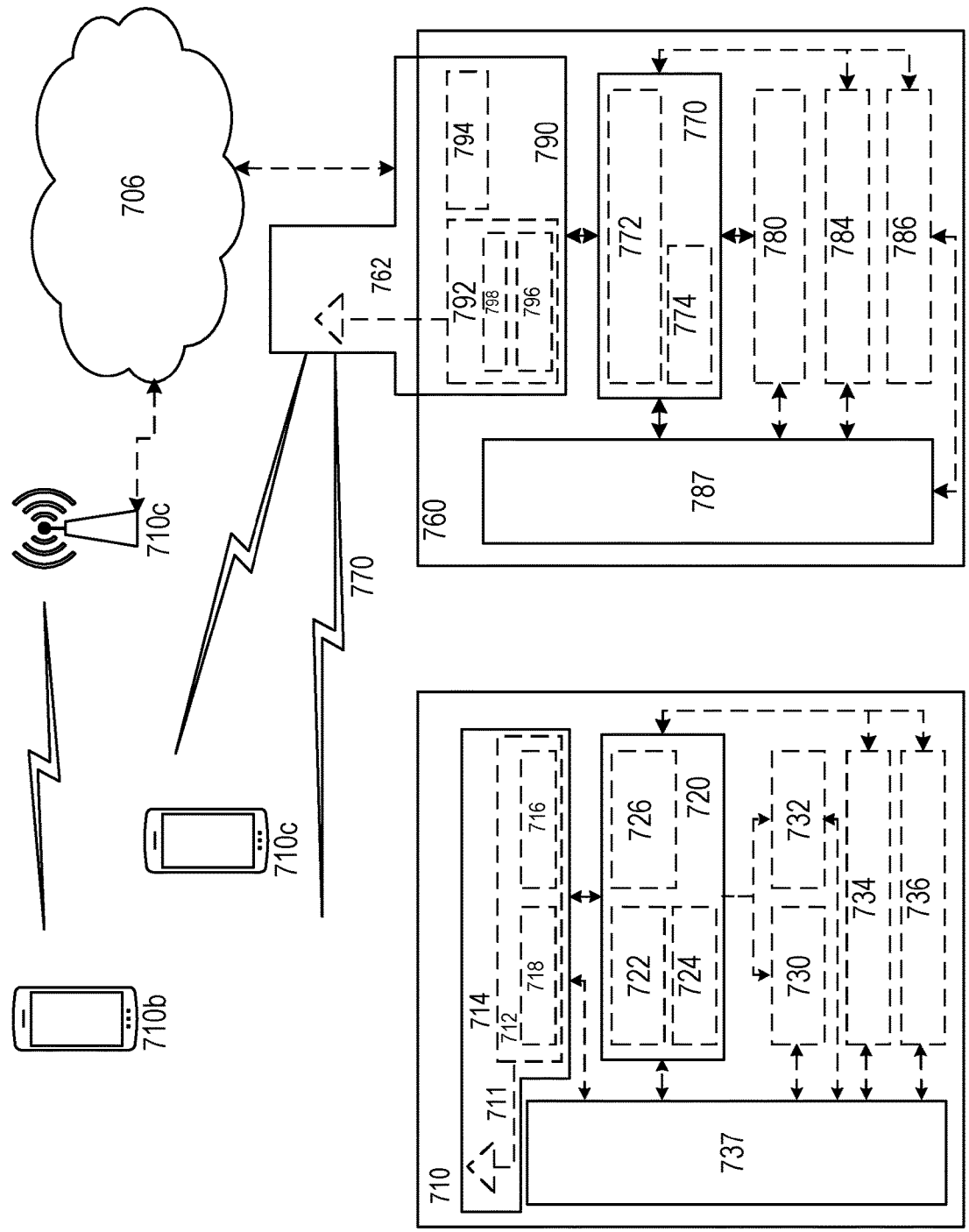
FIG. 7 illustrates an example wireless network.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless device 710 may comprise an aerial wireless device, for example a drone as illustrated in FIG. 1. The network node 760 may be a network node as described in the above embodiments, and may for example be configured to carry out a method as described with respect to FIGS. 6 and 7. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
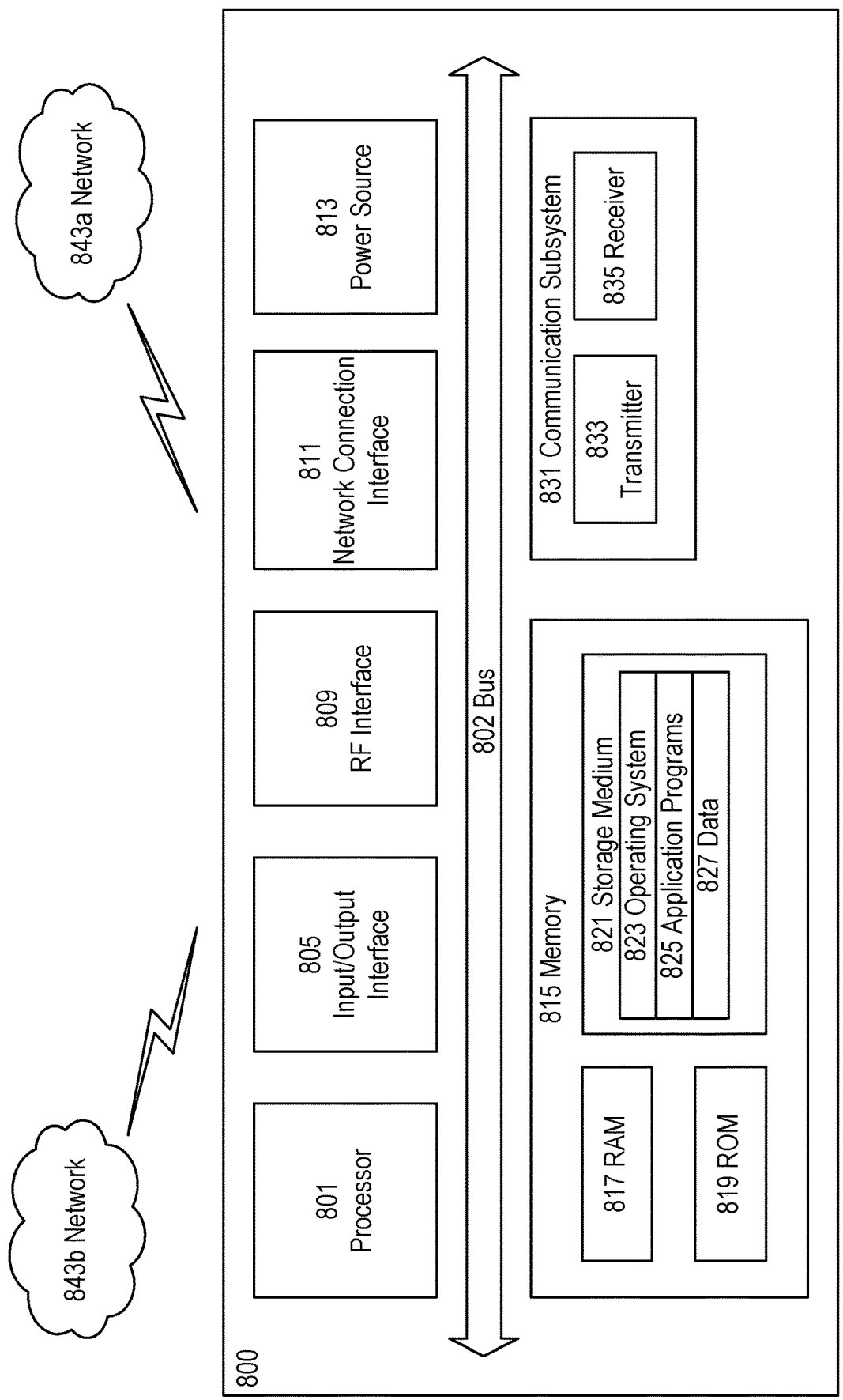
FIG. 8 illustrates one embodiment of a UE in accordance with various aspects described herein.

FIG. 8 illustrates one embodiment of a UE in accordance with various aspects described herein. The UE 8200 may comprise a wireless device, for example an aerial wireless device as described with respect to the aforementioned embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
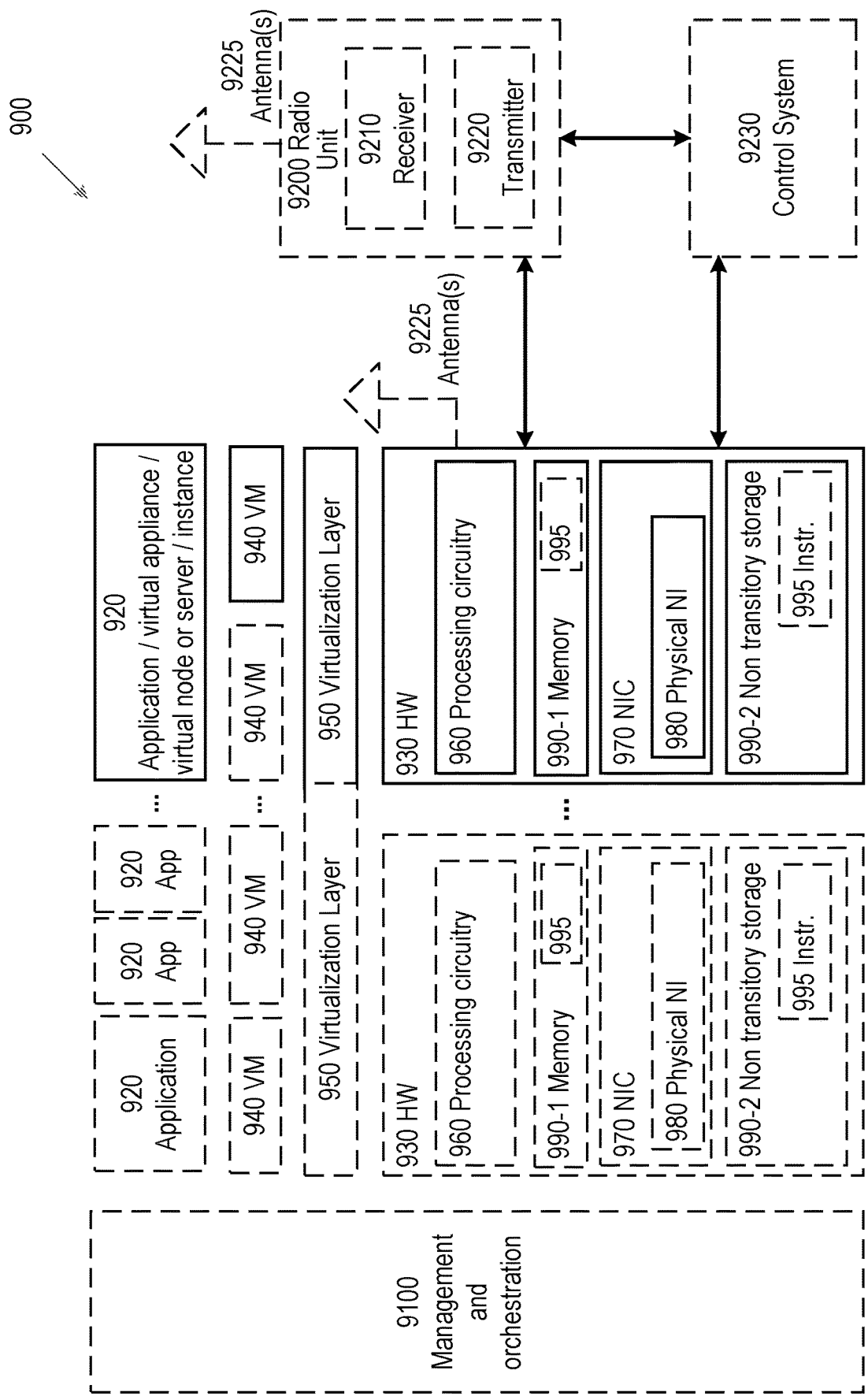
FIG. 9 is a schematic block diagram illustrating a virtualization environment 900 in which functions implemented by some embodiments may be virtualized.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks). In particular, virtualization may be applied to the network node as described in above embodiments, for example a network node configured to carry out the method as described with respect to FIGS. 5 and 6.

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
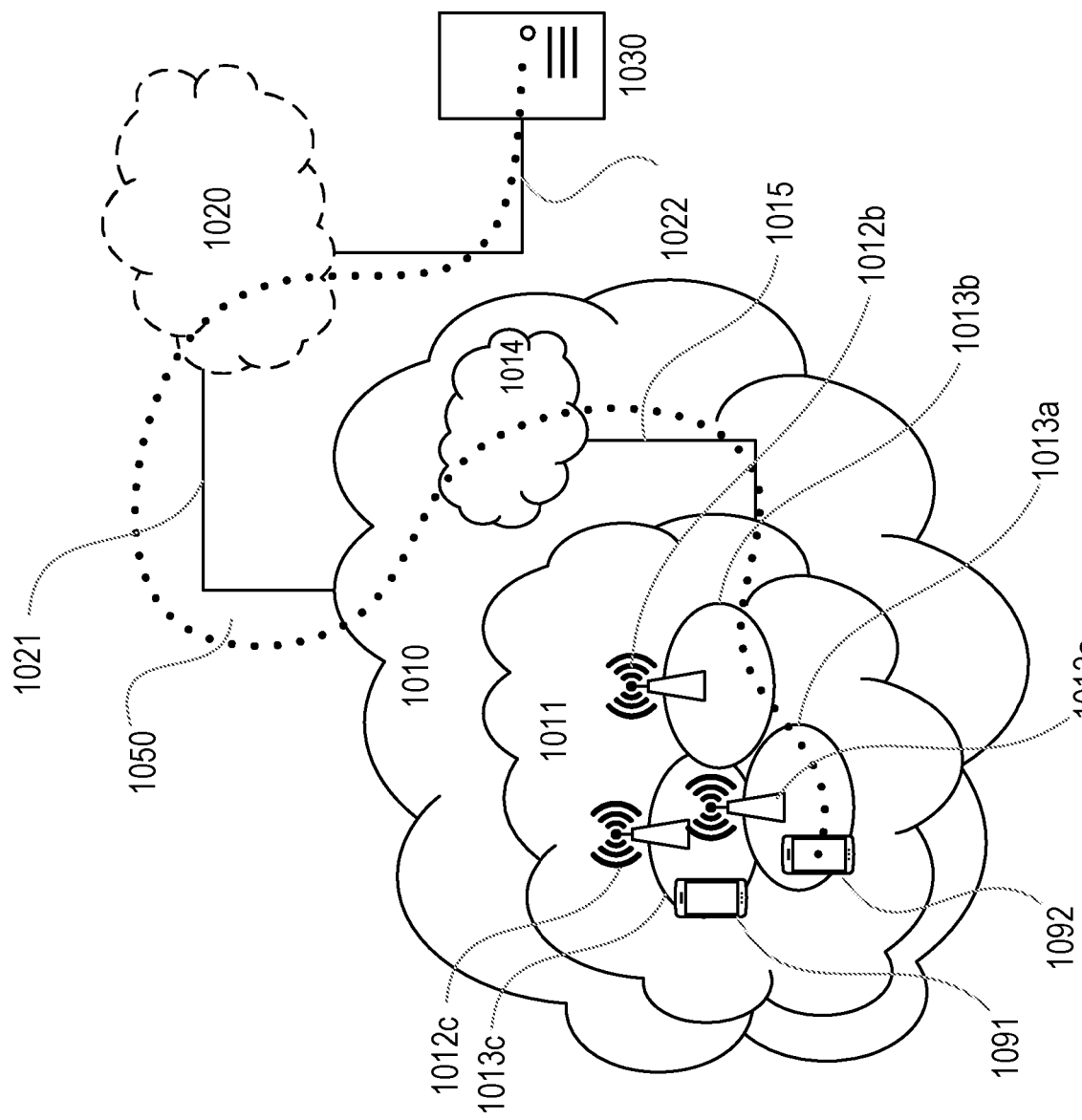
FIG. 10 illustrates an example telecommunications network.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012. Each base station 1012*a*, 1012*b*, 1012*c* may be configured to carry out the method as described with respect to FIGS. 5 and 6. Each UE 1091, 1092 may be an aerial wireless device or a terrestrial wireless device.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
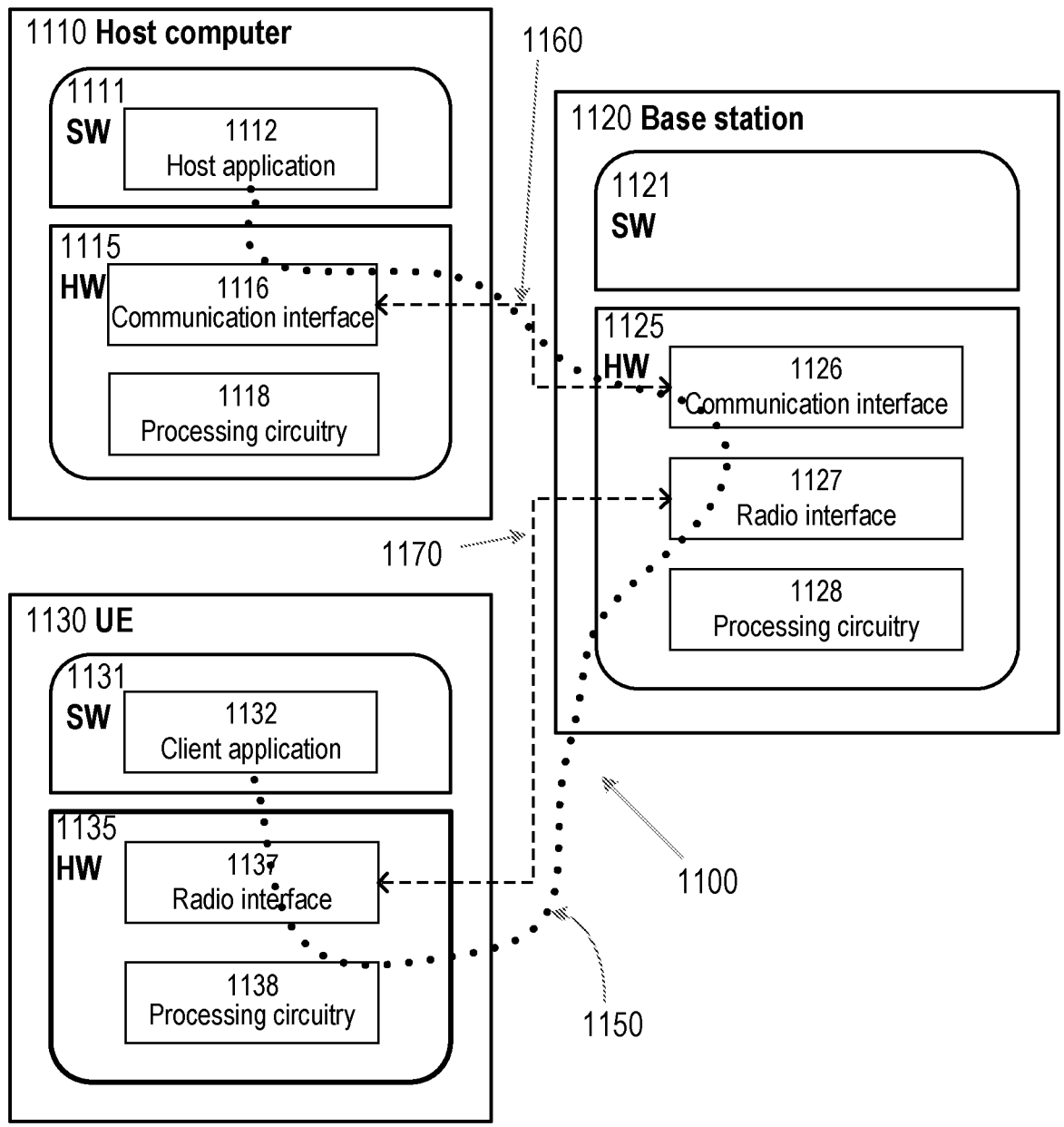
FIG. 11 illustrates example implementations, in accordance with an embodiment, of a UE, base station and host computer.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the method of categorizing wireless devices, where such categorization enables the network to reduce interference of the aerial wireless devices with the terrestrial wireless devices. This improved method of categorization provide benefits such as reduced load on the network.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
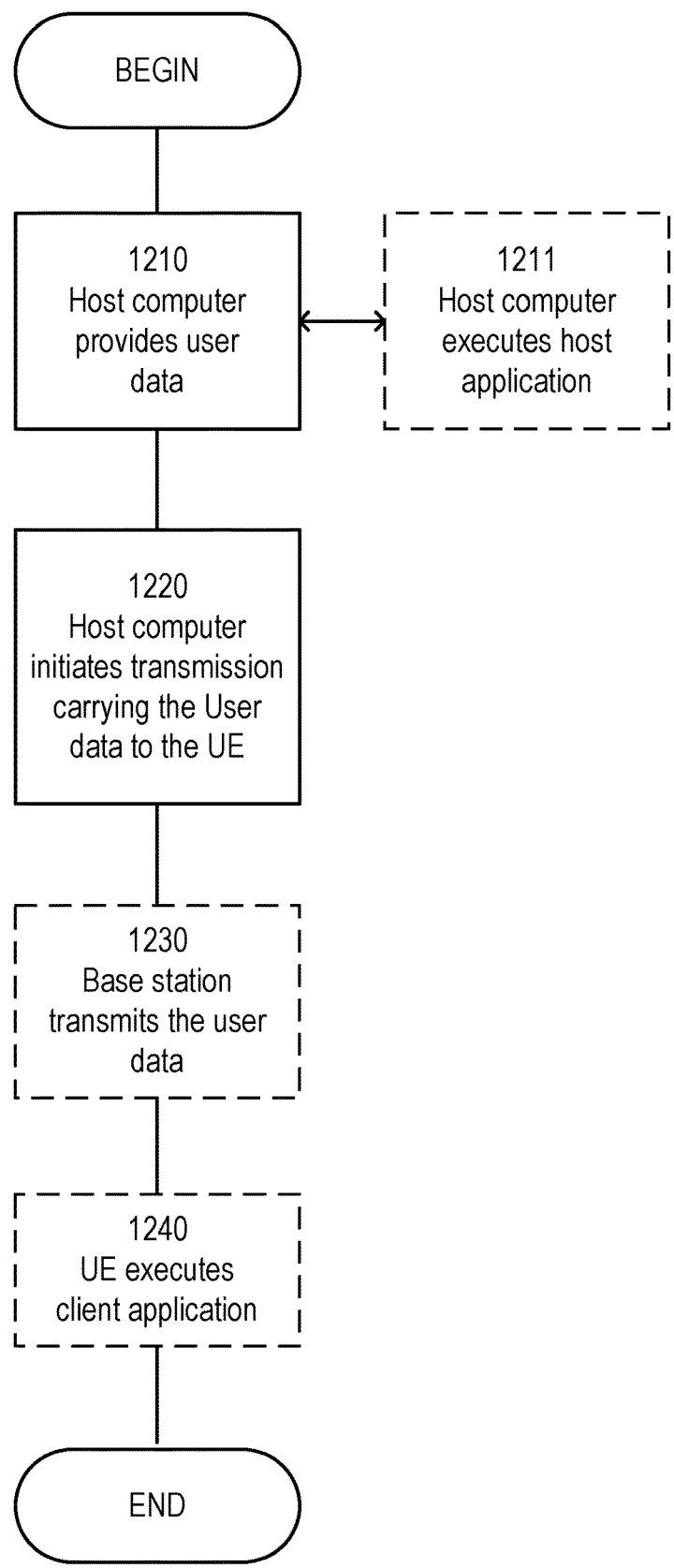
FIG. 12 is a flowchart illustrating a method implemented in a communication system, in accordance with one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
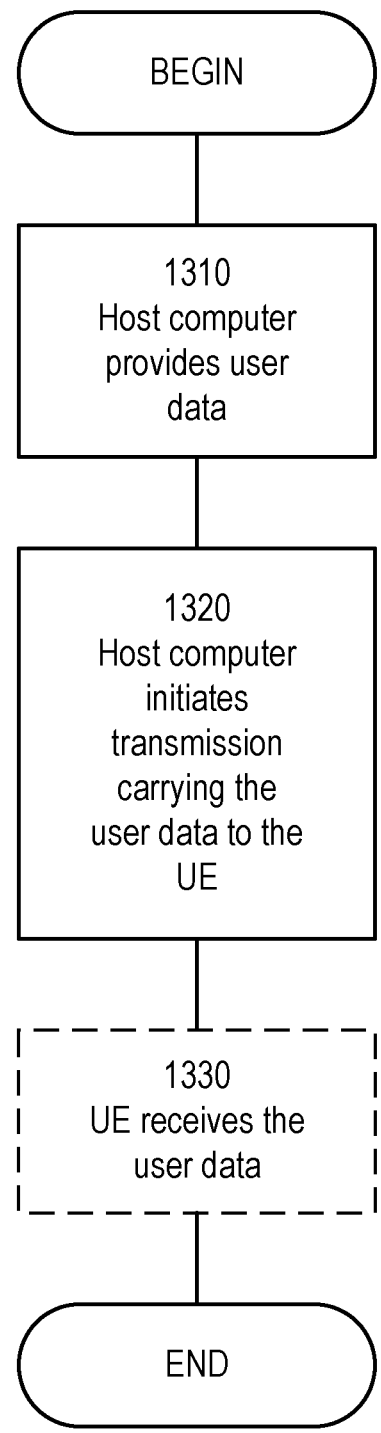
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
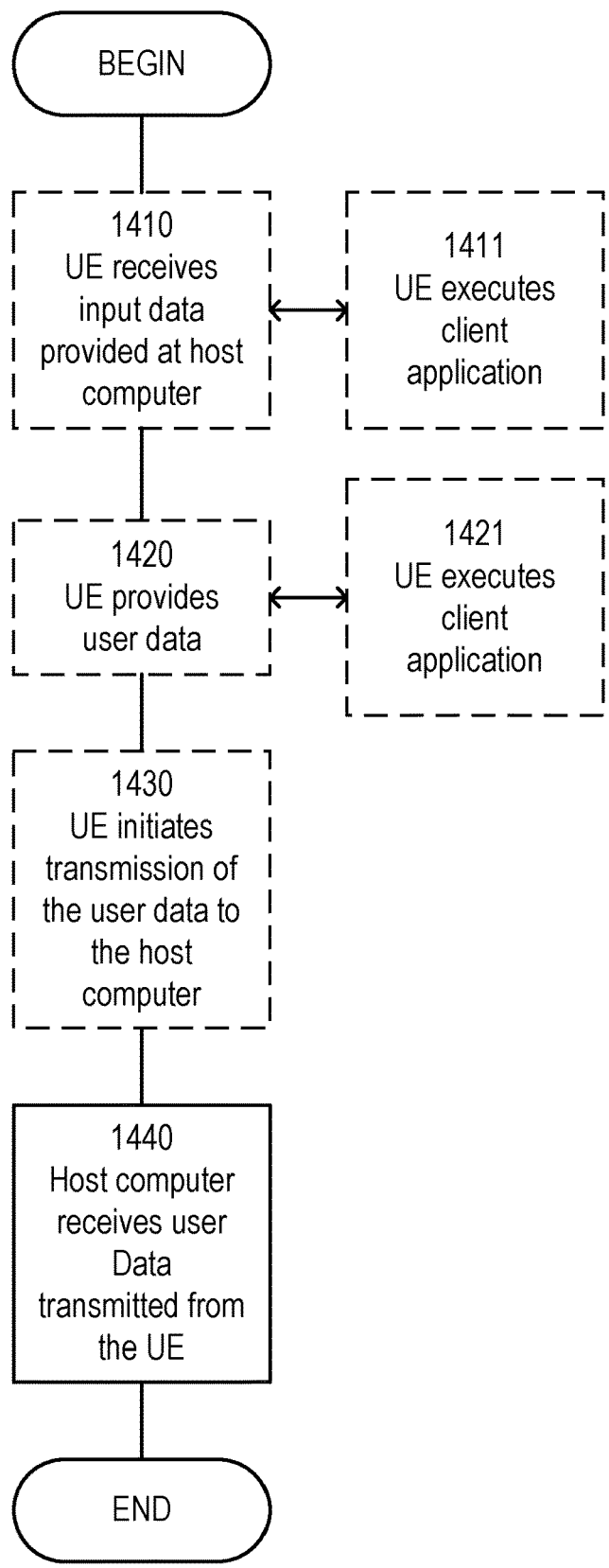
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
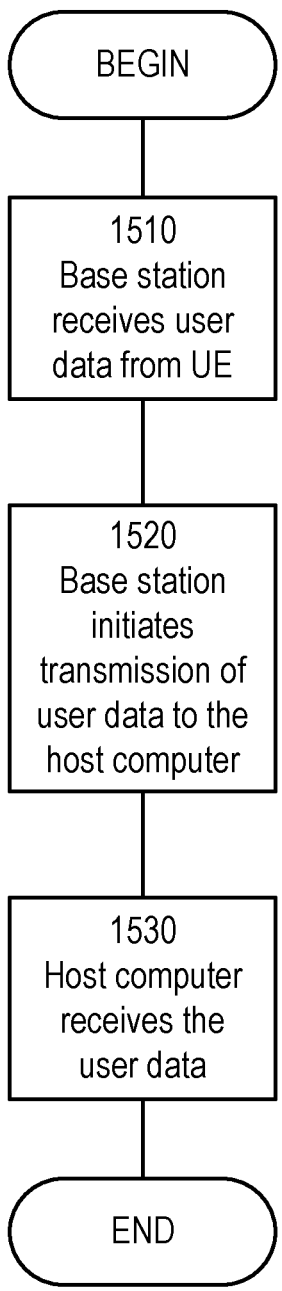
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Figure 16:
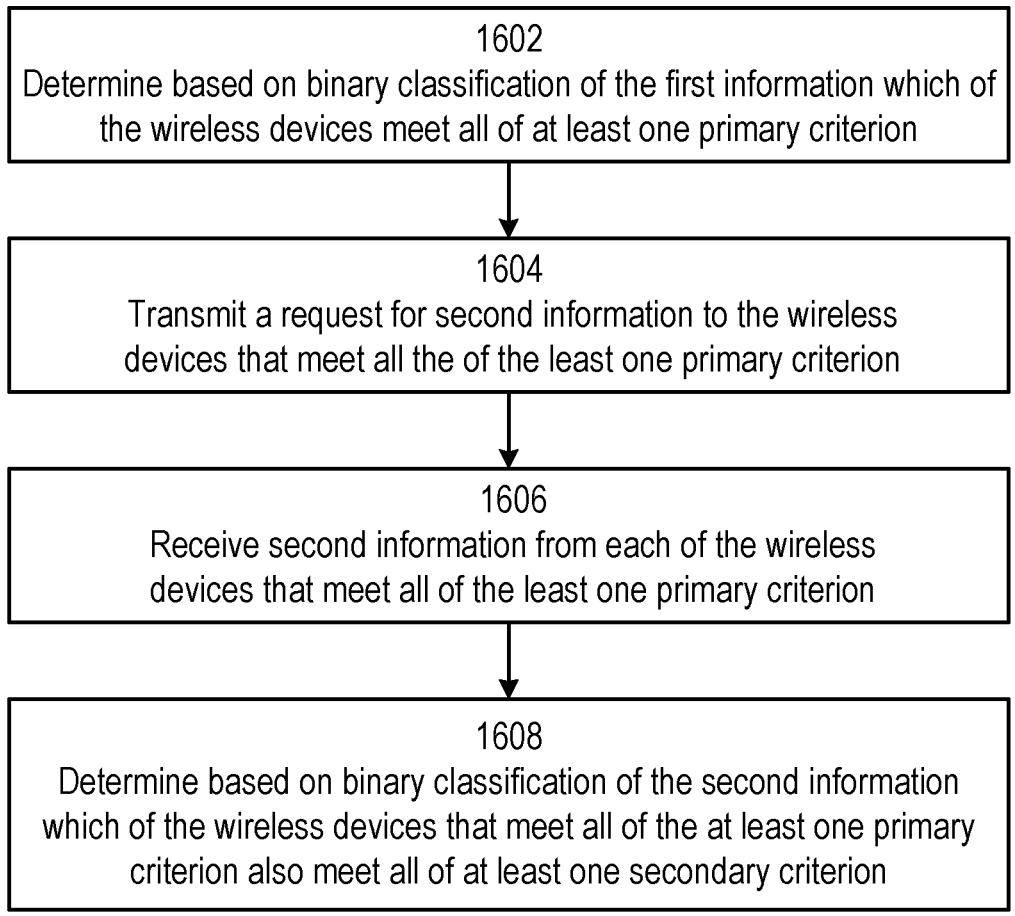
FIG. 16 depicts a method in accordance with particular embodiments.

FIG. 16 depicts a method in accordance with particular embodiments, the method begins at step 1602 with determining based on binary classification of the first information which of the wireless devices meet all of at least one primary criterion. In step 1604 the method comprises transmitting a request for second information to the wireless devices that meet all of the at least one primary criterion. In step 1606 the method comprises receiving second information from each of the wireless device that meet all of the at least one primary criterion. In step 1608 the method comprises determining based on binary classification of the second information which of the wireless devices that meet all of the at least one primary criterion also meet all of at least one secondary criterion.

Figure 17:
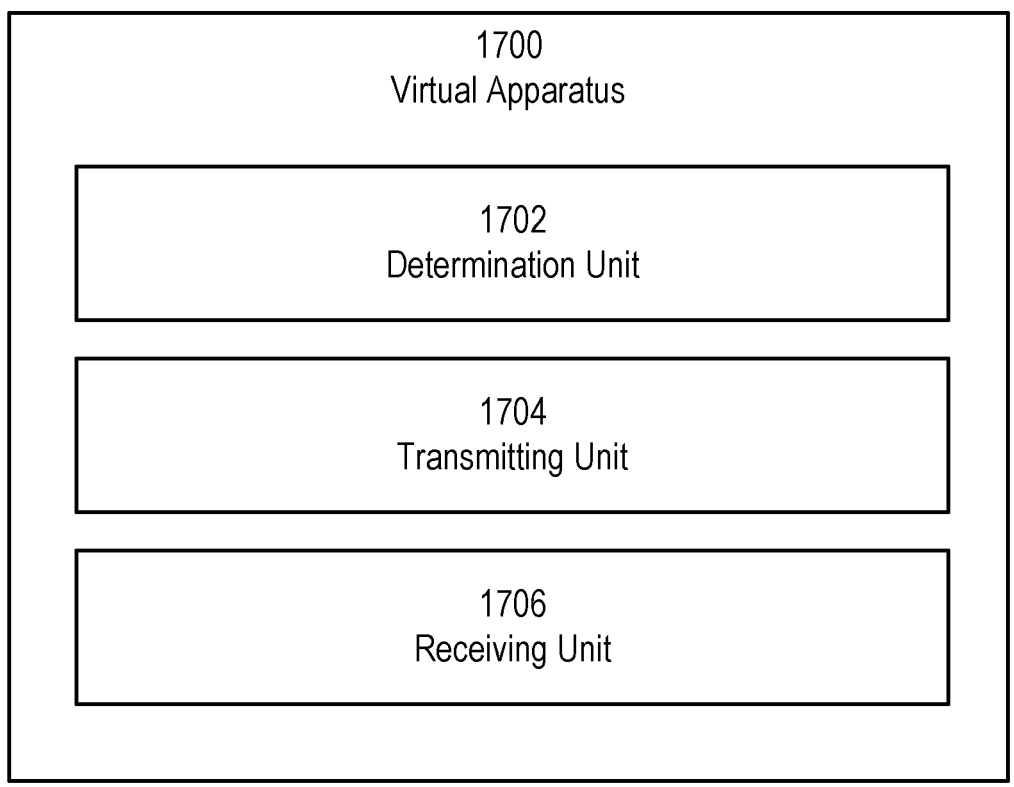
FIG. 17 illustrates a schematic block diagram of an apparatus 1700 in a wireless network.

FIG. 17 illustrates a schematic block diagram of an apparatus 1700 in a wireless network (for example, the wireless network shown in FIG. 7). The apparatus may be implemented in a wireless device or network node (e.g., wireless device 710 or network node 760 shown in FIG. 7). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Determination unit 1702, Transmitting unit 1704, and Receiving Unit 1706 and any other suitable units of apparatus 1700 to perform corresponding functions according one or more embodiments of the present disclosure.

As illustrated in FIG. 17, apparatus 1700 includes Determination unit 1702, Transmitting unit 1704, and Receiving Unit 1706. Determination unit 1702 is configured to determine based on binary classification of the first information which of the wireless devices meet all of at least one primary criterion. Transmitting unit 1704 is configured to transmit a request for second information to the wireless devices that meet all of the at least one primary criterion. Receiving unit 1706 is configured to receive second information from each of the wireless device that meet all of the at least one primary criterion. The Determination unit 1702 is further configured to determine based on binary classification of the second information which of the wireless devices that meet all of the at least one primary criterion also meet all of at least one secondary criterion.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method, in a wireless device in a communications network, for providing second information to a network node to allow the network node to determine which of a first category associated with a first wireless device behaviour and a second category associated with a second wireless device behaviour the wireless device falls into, the method comprising:
   receiving a request for second information from the network node; and
   transmitting second information to the network node.

Group B Embodiments

2. A method, in a network node in a communications network, for determining which of a first category associated with a first wireless device behaviour and a second category associated with a second wireless device behaviour each of a plurality of wireless devices fall into, the method comprising:
   determining based on binary classification of the first information which of the wireless devices meet all of at least one primary criterion;
   transmitting a request for second information to the wireless devices that meet all of the at least one primary criterion;
   receiving second information from each of the wireless device that meet all of the at least one primary criterion;
   determining based on binary classification of the second information which of the wireless devices that meet all of the at least one primary criterion also meet all of at least one secondary criterion.
3. The method of embodiment 2 further comprising classifying the wireless devices that meet both all of the at least one primary criterion and all of the at least one secondary criterion into the first category.
4. The method of embodiment 2 or 3 wherein the step of determining which of the wireless devices that meet all of the at least one primary criterion also meet all of at least one secondary criterion is also based on the first information.
5. The method of embodiment 4 wherein the at least one primary criterion are such that wireless devices meeting all of the at least one primary criterion have a first false positive rate and a first true positive rate of being in the first category.
6. The method of embodiment 5 wherein the at least one secondary criterion are such that wireless devices meeting all of the at least one secondary criterion have a second false positive rate and a second true positive rate for being in the first category, wherein the second false positive rate is lower than the first false positive rate and the second true positive rate is lower than or equal to the first true positive rate.
7. The method of embodiment 6 wherein the first and second true positive rate and the first and second false positive rates are computed based on all the wireless devices.
8. The method as in any one of embodiments 2 to 7 further comprising:
   classifying the wireless device that do not meet all of the all primary criterion into the second category.
9. The method as in any one of embodiments 2 to 8 further comprising:
   classifying the wireless devices that do not meet all of the at least one secondary criterion into the second category.
10. The method as in any one of embodiments 2 to 9 further comprising generating the at least one primary criterion using machine learning based on training information of a same type as the first information.
11. The method as in any one of embodiments 2 to 10 further comprising generating the at least one secondary criterion using machine learning based on training information of a same type as the second information.
12. The method as in embodiment 11 further comprising continually updating the at least one primary criterion using machine learning based on wireless devices classified into the second category on the basis of not meeting all of the at least one secondary criterion.
13. The method as in any one of embodiments 2 to 12 wherein the first information comprises network information provided to the network as part of normal operation of the first wireless device.
14. The method as in any one of embodiments 2 to 13 wherein the first category comprises a drone category and the second category comprises a non-drone category.
15. The method as in any one of embodiments 2 to 14 wherein the first information comprises one or more of: timing advance measurements, an amount of requested uplink resources; uplink signal strength measurements; handover statistics; line of sight detection in downlink.
16. The method as in any one of embodiments 2 to 15 wherein the second information comprises one or more of measurements on dedicated uplink pilot transmissions, periodic downlink measurement reports comprising measurements of reference signal received power from different cells; channel state information reference signal, CSI-RS, related measurement reports.
17. The method as in any one of embodiments 2 to 16 wherein a wireless communications service provided to each wireless device is adjusted based on the category that each wireless device is classified into.
18. The method as in any one of embodiments 2 to 17 wherein the method is repeated for wireless devices in the first category to separate the wireless devices in the first category into a third and fourth category.
19. The method as in any one of embodiments 2 to 18 wherein the network node comprises a base station.
20. The method as in any one of embodiments 2 to 18 wherein the network node comprises a Network Data Analytics node in the core network.

Group C Embodiments

21. A wireless device for providing information to a network node, the wireless device comprising:
    processing circuitry configured to perform any of the steps of any of the Group A embodiments; and
    power supply circuitry configured to supply power to the wireless device.
22. A base station for determining which of a first category associated with a first wireless device behaviour and a second category associated with a second wireless device behaviour each of the wireless devices fall into, the base station comprising:
processing circuitry configured to perform any of the steps of any of the Group B embodiments;
power supply circuitry configured to supply power to the base station.

23. A user equipment (UE) for providing information to a network node, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

24. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

25. The communication system of the previous embodiment further including the base station.

26. The communication system of the previous 2 embodiments, further including the UE, wherein the UE is configured to communicate with the base station.

27. The communication system of the previous 3 embodiments, wherein:
the processing circuitry of the host computer is configured to execute a host application, thereby providing the user data; and
the UE comprises processing circuitry configured to execute a client application associated with the host application.

28. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

29. The method of the previous embodiment, further comprising, at the base station, transmitting the user data.

30. The method of the previous 2 embodiments, wherein the user data is provided at the host computer by executing a host application, the method further comprising, at the UE, executing a client application associated with the host application.

31. A user equipment (UE) configured to communicate with a base station, the UE comprising a radio interface and processing circuitry configured to performs the of the previous 3 embodiments.

32. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

33. The communication system of the previous embodiment, wherein the cellular network further includes a base station configured to communicate with the UE.

34. The communication system of the previous 2 embodiments, wherein:
the processing circuitry of the host computer is configured to execute a host application, thereby providing the user data; and
the UE's processing circuitry is configured to execute a client application associated with the host application.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

36. The method of the previous embodiment, further comprising at the UE, receiving the user data from the base station.

37. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

38. The communication system of the previous embodiment, further including the UE.

39. The communication system of the previous 2 embodiments, further including the base station, wherein the base station comprises a radio interface configured to communicate with the UE and a communication interface configured to forward to the host computer the user data carried by a transmission from the UE to the base station.

40. The communication system of the previous 3 embodiments, wherein:
the processing circuitry of the host computer is configured to execute a host application; and
the UE's processing circuitry is configured to execute a client application associated with the host application, thereby providing the user data.

41. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

42. A method implemented in a communication system including a host computer, a base station and a user equipment (UE), the method comprising:
at the host computer, receiving user data transmitted to the base station from the UE, wherein the UE performs any of the steps of any of the Group A embodiments.

43. The method of the previous embodiment, further comprising, at the UE, providing the user data to the base station.

44. The method of the previous 2 embodiments, further comprising:
at the UE, executing a client application, thereby providing the user data to be transmitted; and
at the host computer, executing a host application associated with the client application.

45. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

46. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

47. The communication system of the previous embodiment further including the base station.

48. The communication system of the previous 2 embodiments, further including the UE, wherein the UE is configured to communicate with the base station.

49. The communication system of the previous 3 embodiments, wherein:
the processing circuitry of the host computer is configured to execute a host application;
the UE is configured to execute a client application associated with the host application, thereby providing the user data to be received by the host computer.

50. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

51. The method of the previous embodiment, further comprising at the base station, receiving the user data from the UE.

52. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

eNB evolved NodeB
BS Base Station
DL Downlink
E-UTRAN Evolved Universal Terrestrial Radio Access Network
FPR False Positive Rate
ISD Inter Site Distance
L3 Layer 3
LTE Long-Term Evolution
MME Mobility Management Entity
ROC Receiver Operating Characteristic
RRC Radio resource control
RSRP Reference Signal Received Power
RSRQ Reference Signal Received Quality
RSSI Received Signal Strength Indicator
SIM Subscriber Identification Module
SINR Signal to Interference-plus-Noise Ratio
SIR Signal to Interference Ratio
TPR True Positive Rate
UAV Unmanned Aerial Vehicles
UE User Equipment
UL Uplink
ML Machine Learning
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method, in a wireless device in a communications network, for providing second information to a network node to allow the network node to determine which of a first category associated with a first wireless device behaviour and a second category associated with a second wireless device behaviour the wireless device falls into, the method comprising:
receiving a request for the second information from the network node, wherein the second information comprises one or more of measurements on dedicated uplink pilot transmissions, sounding references signal (SRS), Random Access Channel (RACH) transmissions and their respective measurements in neighboring base stations, periodic downlink measurement reports comprising measurements of reference signal received power from different cells, channel state information reference signal (CSI-RS), and related measurement reports, and wherein the wireless device has already met a primary criterion based on classification of first information, wherein the first information comprises one or more measurements of timing advance (TA) measurements, an amount of requested uplink resources, uplink signal strength measurements, handover statistics, line of sight detection in downlink; and
transmitting the second information to the network node, wherein a secondary criterion is associated with the second information, wherein the wireless device is classified into the first category only if the wireless device meets both the primary criterion and the secondary criterion, wherein the step of determining which of the wireless devices that meet all of the at least one primary criterion also meet all of at least one secondary criterion is also based on the first information, wherein the at least one primary criterion are such that wireless devices meeting all of the at least one primary criterion have a first false positive rate and a first true positive rate of being in the first category, wherein the secondary criterion is such that wireless device meeting the secondary criterion have a second false positive rate and a second true positive rate for being in the first category, wherein the second false positive rate is lower than the first false positive rate and the second true positive rate is lower than or equal to the first true positive rate, and wherein the first category comprises a drone category and the second category comprises a non-drone category.

2. A method, in a network node in a communications network, for determining which of a first category associated with a first wireless device behaviour and a second category associated with a second wireless device behaviour each of a plurality of wireless devices fall into, the method comprising:
determining based on binary classification of first information which of the wireless devices meet all of at least one primary criterion to produce a subset of the wireless devices that meet all of the at least one primary criterion, wherein the first information comprises one or more measurements of timing advance (TA) measurements, an amount of requested uplink resources, uplink signal strength measurements, handover statistics, line of sight detection in downlink;
transmitting a request for second information to the subset of the wireless devices that meet all of the at least one primary criterion, wherein the second information comprises one or more of measurements on dedicated uplink pilot transmissions, sounding references signal (SRS), Random Access Channel (RACH) transmissions and their respective measurements in neighboring base stations, periodic downlink measurement reports comprising measurements of reference signal received power from different cells, channel state information reference signal (CSI-RS), and related measurement reports;
receiving the second information from each of the subset of the wireless devices that meet all of the at least one primary criterion;
determining based on binary classification of the second information which of the subset of the wireless devices that meet all of the at least one primary criterion also meet all of at least one secondary criterion; and
classifying the subset of the wireless devices that meet both all of the at least one primary criterion and all of the at least one secondary criterion into the first category, wherein the classification is based on at least one of: the first information comprising an amount of uplink resources requested by the first wireless device and the second wireless device, line of sight (LOS) detection in downlink, or handover statistics of the first wireless device and the second wireless device, wherein the step of determining which of the wireless devices that meet all of the at least one primary criterion also meet all of at least one secondary criterion is also based on the first information, wherein the at least one primary criterion are such that wireless devices meeting all of the at least one primary criterion have a first false positive rate and a first true positive rate of being in the first category, wherein the at least one secondary criterion is such that wireless devices meeting all of the at least one secondary criterion have a second false positive rate and a second true positive rate for being in the first category, wherein the second false positive rate is lower than the first false positive rate and the second true positive rate is lower than or equal to the first true positive rate, and wherein the first category comprises a drone category and the second category comprises a non-drone category.

3. The method of claim 2, wherein the first and second true positive rate and the first and second false positive rates are computed based on all the wireless devices.

4. The method of claim 2, further comprising:
classifying the wireless device that do not meet all of the all primary criterion into the second category.

5. The method of claim 2, further comprising: classifying the wireless devices that do not meet all of the at least one secondary criterion into the second category.

6. The method of claim 2, further comprising generating the at least one primary criterion using machine learning based on training information of a same type as the first information.

7. The method of claim 2, further comprising generating the at least one secondary criterion using machine learning based on training information of a same type as the second information.

8. The method as in claim 7, further comprising continually updating the at least one primary criterion using machine learning based on wireless devices classified into the second category on the basis of not meeting all of the at least one secondary criterion.

9. The method of claim 2, wherein the first information comprises network information provided to the network as part of normal operation of the first wireless device.

10. The method of claim 2, wherein a wireless communications service provided to each wireless device is adjusted based on the category that each wireless device is classified into.

11. The method of claim 2, wherein the method is repeated for wireless devices in the first category to separate the wireless devices in the first category into a third and fourth category.

12. The method of claim 2, wherein the network node comprises a base station.

13. The method of claim 2, wherein the network node comprises a Network Data Analytics node in a core network of the communications network.

14. A wireless device in a communications network, for providing second information to a network node to allow the network node to determine which of a first category associated with a first wireless device behaviour and a second category associated with a second wireless device behaviour, wherein the wireless device comprises a processing circuitry configured to:
receiving a request for the second information from the network node, wherein the second information comprises one or more of measurements on dedicated uplink pilot transmissions, sounding references signal (SRS), Random Access Channel (RACH) transmissions and their respective measurements in neighboring base stations, periodic downlink measurement reports comprising measurements of reference signal received power from different cells, channel state information reference signal (CSI-RS), and related measurement reports, and wherein the wireless device has already met a primary criterion based on classification of first information, wherein the first information comprises one or more measurements of timing advance (TA) measurements, an amount of requested uplink resources, uplink signal strength measurements, handover statistics, line of sight detection in downlink; and
transmitting the second information to the network node, wherein a secondary criterion is associated with the second information, and wherein the wireless device is classified into the first category only if the wireless device meets both the primary criterion and the secondary criterion, wherein the step of determining which of the wireless devices that meet all of the at least one primary criterion also meet all of at least one secondary criterion is also based on the first information, wherein the at least one primary criterion are such that wireless devices meeting all of the at least one primary criterion have a first false positive rate and a first true positive rate of being in the first category, wherein the secondary criterion is such that wireless devices meeting the secondary criterion have a second false positive rate and a second true positive rate for being in the first category, wherein the second false positive rate is lower than the first false positive rate and the second true positive rate is lower than or equal to the first true positive rate, and wherein the first category comprises a drone category and the second category comprises a non-drone category.

15. A network node in a communications network, for determining which of a first category associated with a first wireless device behaviour and a second category associated with a second wireless device behaviour each of a plurality of wireless devices fall into, the network node comprising processing circuitry configured to:
    determine based on binary classification of first information which of the wireless devices meet all of at least one primary criterion to produce a subset of the wireless devices that meet all of the at least one primary criterion, wherein the first information comprises one or more measurements of timing advance (TA) measurements, an amount of requested uplink resources, uplink signal strength measurements, handover statistics, line of sight detection in downlink;
    transmit a request for second information to the subset of the wireless devices that meet all of the at least one primary criterion, wherein the second information comprises one or more of measurements on dedicated uplink pilot transmissions, sounding references signal (SRS), Random Access Channel (RACH) transmissions and their respective measurements in neighboring base stations, periodic downlink measurement reports comprising measurements of reference signal received power from different cells, channel state information reference signal (CSI-RS), and related measurement reports;
    receive the second information from each of the subset of the wireless device that meet all of the at least one primary criterion;
    determine based on binary classification of the second information which of the subset of the wireless devices that meet all of the at least one primary criterion also meet all of at least one secondary criterion; and
    classify the subset of the wireless devices that meet both all of the at least one primary criterion and all of the at least one secondary criterion into the first category, wherein the classification is based on at least one of: the first information comprising an amount of uplink resources requested by the first wireless device and the second wireless device, line of sight (LOS) detection in downlink, or handover statistics of the first wireless device and the second wireless device, wherein the step of determining which of the wireless devices that meet all of the at least one primary criterion also meet all of at least one secondary criterion is also based on the first information, wherein the at least one primary criterion are such that wireless devices meeting all of the at least one primary criterion have a first false positive rate and a first true positive rate of being in the first category, wherein the at least one secondary criterion is such that wireless devices meeting all of the at least one secondary criterion have a second false positive rate and a second true positive rate for being in the first category, wherein the second false positive rate is lower than the first false positive rate and the second true positive rate is lower than or equal to the first true positive rate, and wherein the first category comprises a drone category and the second category comprises a non-drone category.

* * * * *